(12) United States Patent
Avijeet

(10) Patent No.: US 12,542,131 B2
(45) Date of Patent: Feb. 3, 2026

(54) SYSTEM AND METHOD FOR COMMUNICATING WITH A USER WITH SPEECH PROCESSING

(71) Applicant: Telepathy Labs, Inc., Tampa, FL (US)

(72) Inventor: Vijeta Avijeet, Zurich (CH)

(73) Assignee: Telepathy Labs, Inc., Tampa, FL (US)

( * ) Notice: Subject to any disclaimer, the term of this patent is extended or adjusted under 35 U.S.C. 154(b) by 296 days.

(21) Appl. No.: 17/418,679

(22) PCT Filed: Dec. 20, 2019

(86) PCT No.: PCT/US2019/067935
§ 371 (c)(1),
(2) Date: Jun. 25, 2021

(87) PCT Pub. No.: WO2020/139770
PCT Pub. Date: Jul. 2, 2020

(65) Prior Publication Data
US 2022/0130378 A1 Apr. 28, 2022

Related U.S. Application Data

(60) Provisional application No. 62/785,476, filed on Dec. 27, 2018.

(51) Int. Cl.
*G10L 15/18* (2013.01)
*G10L 13/047* (2013.01)
(Continued)

(52) U.S. Cl.
CPC ........ *G10L 15/1815* (2013.01); *G10L 13/047* (2013.01); *G10L 15/16* (2013.01); *G10L 15/22* (2013.01); *G10L 15/30* (2013.01)

(58) Field of Classification Search
None
See application file for complete search history.

(56) References Cited

U.S. PATENT DOCUMENTS

2015/0066479 A1* 3/2015 Pasupalak ......... G06F 16/90332
704/9
2015/0142704 A1 5/2015 London
(Continued)

FOREIGN PATENT DOCUMENTS

| KR | 1020160021787 A | 2/2016 |
|---|---|---|
| KR | 1020180109633 A | 10/2018 |
| WO | 2017053311 A1 | 3/2017 |

OTHER PUBLICATIONS

McCann, et al. "The natural language decathlon: multitask learning as question answering", arXiv, Jun. 20, 2018 (Year: 2018).*
(Continued)

*Primary Examiner* — Nicole A K Schmieder
(74) *Attorney, Agent, or Firm* — Michael T. Abramson; Jordan IP Law, LLC

(57) ABSTRACT

A method and speech processing system for communicating with a user is provided. A speech signal may be received. The received speech signal may be processed by a first unified neural network to extract one or more of intents and entities. The one or more of intents and entities may be analyzed to generate a dialogue response. A second unified neural network may generate a speech output corresponding to the dialogue response for the user. In another example, a single unified neural network may process the received speech signal to extract one or more of intents and entities. The one or more of intents and entities may be analyzed, by the single unified neural network, to generate a dialogue response. The single unified neural network may generate a speech output corresponding to the dialogue response for the user.

17 Claims, 18 Drawing Sheets

(51) Int. Cl.
*G10L 15/16* (2006.01)
*G10L 15/22* (2006.01)
*G10L 15/30* (2013.01)

(56) References Cited

U.S. PATENT DOCUMENTS

2017/0092266 A1* 3/2017 Wasserblat .......... G10L 15/1815
2018/0314689 A1  11/2018 Wang et al.
2019/0156210 A1*  5/2019 He ........................ G06N 3/045

OTHER PUBLICATIONS

Chen et al. "Spoken language understanding without speech recognition", ICASSP Apr. 2018 (Year: 2018).*
Bulyko et al. "Efficient integrated response generation from multiple targets using weighted finite state transducers", Computer Speech and Language, 16, 2002 pp. 533-550 (Year: 2002).*
International Search Report and Written Opinion mailed on Apr. 24, 2020 in International Application Serial No. PCT/US2019/067935.

* cited by examiner

SYSTEM AND METHOD FOR COMMUNICATING WITH A USER WITH SPEECH PROCESSING

CROSS-REFERENCE TO RELATED APPLICATIONS

This application is a U.S. National Stage of International Patent Application No. PCT/US2019/067935, filed on Dec. 20, 2019, which claims the benefit of U.S. Provisional Application Ser. No. 62/785,476, filed on Dec. 27, 2018. The disclosures of which are incorporated herein by reference in their entirety.

BACKGROUND

Speech processing systems may be unreliable and slow and may be frustrating to users when they are not accurate. There may be a general desire to improve speech technology such as improve speech recognition performance and/or improve speech synthesis performance.

BRIEF SUMMARY OF DISCLOSURE

In one example implementation, a speech processing system for communicating with a user may include an input interface configured to receive a speech signal. A first unified neural network may comprise an automatic speech recognition (ASR) section and a natural language understanding (NLU) section configured to process the received speech signal to extract one or more of intents and entities. A dialogue manager may be configured to analyze the extracted intents and entities to generate an appropriate dialogue response. The speech processing system may further comprise a second unified neural network that may comprise a natural language generator (NLG) section and a text-to-speech (TTS) section configured to generate a speech output corresponding to the dialogue response for the user.

One or more of the following example features may be included. The ASR section of the first unified neural network may be configured to convert the speech signal into a first network state and the NLU section of the first unified neural network may be configured to extract the one or more of intents and entities from the first network state. The NLG section of the second unified neural network may be configured to generate a second network state corresponding to the dialogue response and the TTS section of the second unified neural network may be configured to convert the second network state into the speech output. The input interface may be further configured to receive one or more events and transmit the one or more events to the dialogue manager. The dialogue manager may be further configured to generate one or more control parameters for the first unified neural network based on the one or more events. The first unified neural network may be configured to implement one or more models based on the one or more control parameters. The dialogue manager may be further configured to fetch data from an external database for analyzing the one or more of intents and entities to generate the dialogue response. The first unified neural network and the second unified neural network may be configured to implement at least one of one or more bi-directional Long Short Term Memory (LSTM) neural networks and one or more transformer neural networks. The first unified neural network may be further configured to extract a semantic relationship between the one or more of intents and entities and the second unified neural network may be further configured to analyze the semantic relationship between the one or more of intents and entities to generate the speech output corresponding to the dialogue response for the user. The entities may be composite entities.

In another example implementation, a speech processing system for communicating with a user may include an input interface configured to receive a speech signal. A single unified neural network may be configured to process the received speech signal to extract one or more of intents and entities. The single unified neural network may be configured to analyze the extracted one or more of intents and entities to generate a dialogue response. The single unified neural network may be configured to generate a speech output corresponding to the dialogue response for the user.

One or more of the following example features may be included. The single unified neural network may include an automatic speech recognition (ASR) section that may be configured to convert the speech signal into a first network state, a natural language understanding (NLU) section that may be configured to extract the one or more of intents and entities from the first network state, a natural language generator (NLG) section that may be configured to generate a second network state corresponding to the dialogue response, and a text-to-speech (TTS) section that may be configured to convert the second network state into the speech output. The single unified neural network may include a dialogue manager section configured to fetch data from an external database for analyzing the one or more of intents and entities to generate the dialogue response. The single neural network may be further configured to process the speech signal to extract a semantic relationship between the one or more of intents and entities. The single neural network may be further configured to analyze the semantic relationship between the one or more of intents and entities to generate the dialogue response. The entities may be composite entities.

In another example implementation, a computer implemented method for speech processing may include receiving a speech signal. The received speech signal may be processed by a first unified neural network to extract one or more of intents and entities. The one or more of intents and entities may be analyzed to generate a dialogue response. The method may include generating, by a second unified neural network, a speech output corresponding to the dialogue response for the user.

One or more of the following example features may be included. The speech signal may be converted into a first network state by an automatic speech recognition (ASR) section of the first unified neural network. The one or more of intents and entities may be extracted from the first network state by a natural language understanding (NLU) section of the first unified neural network. A second network state corresponding to the dialogue response may be generated by a natural language generator (NLG) section of the second unified neural network. The second network state may be converted into the speech output by a text-to-speech (TTS) section of the second unified neural network. The entities may be composite entities.

In another example implementation, a computer implemented method for speech processing may include receiving a speech signal. The received speech signal may be processed by a single unified neural network to extract one or more of intents and entities. The one or more of intents and entities may be analyzed, by the single unified neural network, to generate a dialogue response. The method may include generating, by the single unified neural network, a speech output corresponding to the dialogue response for the user.

One or more of the following example features may be included. The speech signal may be converted into a first network state by an automatic speech recognition (ASR) section of the single unified neural network. The one or more of intents and entities may be extracted from the first network state by a natural language understanding (NLU) section of the single unified neural network. A second network state corresponding to the dialogue response may be generated by a natural language generator (NLG) section of the single unified neural network. The second network state may be converted into the speech output by a text-to-speech (TTS) section of the single unified neural network. The method may include fetching, by a dialogue manager section of the single unified neural network, data from an external database for analyzing the one or more of intents and entities to generate the dialogue response. The entities may be composite entities.

In another example implementation, a speech processing system for communicating with a user, including one or more processors and one or more memories configured to perform operations may include receiving a speech signal. A unified neural network may include an automatic speech recognition (ASR) section and a natural language understanding (NLU) section. The unified neural network may process the speech signal to extract one or more of intents and entities. The one or more of intents and entities may be analyzed to generate a dialogue response.

One or more of the following example features may be included. The operations may further include converting the speech signal into a network state and extracting the one or more of intents and entities from the network state. The operations may further include generating a natural language text response corresponding to the dialogue response and converting the natural language text response into the speech output. The entities may be composite entities.

In another example implementation, a speech processing system for communicating with a user that may include an input interface configured to receive a speech signal. An automatic speech recognition (ASR) based neural network may be configured to convert the speech signal into text information. A natural language understanding (NLU) based neural network may be configured to extract one or more of intents and entities from the text information. A dialogue manager may be configured to analyze the intents and entities to generate a dialogue response. A unified neural network may include a natural language generator (NLG) section and a text-to-speech (TTS) section that may be configured to generate a speech output corresponding to the dialogue response for the user.

One or more of the following example features may be included. The NLG section may be further configured to generate a network state corresponding to the dialogue response. The TTS section may be further configured to convert the network state into the speech output. The entities may be composite entities.

Other example implementations or embodiments may include but are not limited to a speech processing system, a method of speech processing, an application client container system, a method of using an application client container system, a computer-implemented method, a computing system including one or more processors and one or more memories configured to perform operations, a computer program product residing on a computer readable storage medium having a plurality of instructions stored thereon which, when executed across one or more processors, causes at least a portion of the one or more processors to perform operations substantially as hereinbefore, and an apparatus configured substantially as hereinbefore.

The details of one or more example implementations are set forth in the accompanying drawings and the description below. Other possible example embodiments, features, aspects, and/or possible example advantages will become apparent from the description, the drawings, and the claims. Some implementations may not have those possible example features and/or possible example advantages, and such possible example embodiments, features, aspects, and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
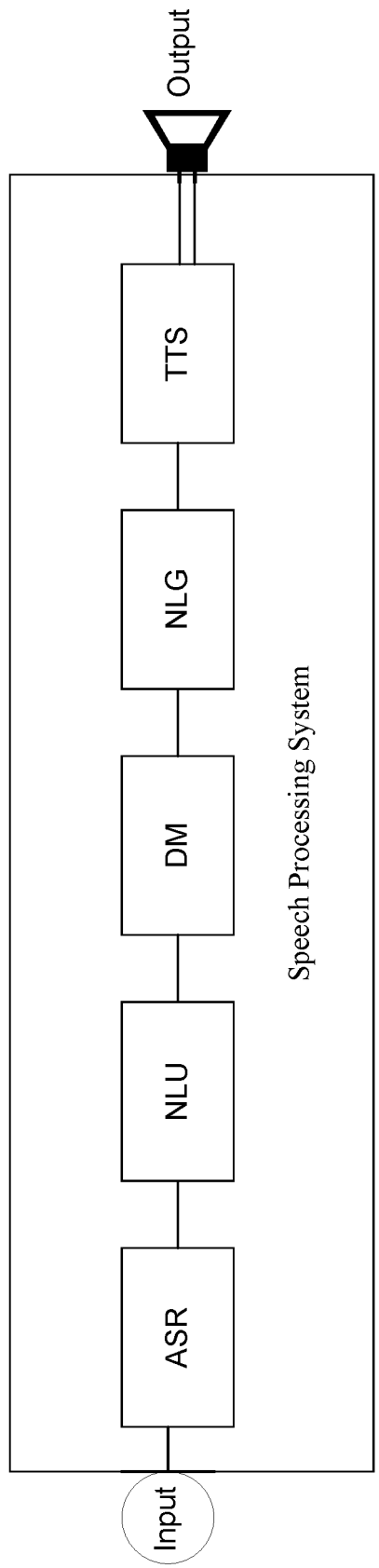
FIG. 1 is a schematic view of an example speech processing system.

Speech processing systems may be unreliable and slow and may be frustrating to users when they are not accurate. There may be a general desire to improve speech technology such as improve speech recognition performance and/or improve speech synthesis performance. In general, improving speech technology has led to approaches in which designing speech and language processing is moved from system and processes based on, e.g., linguistics and speech science, to, e.g., artificial intelligence-based techniques. Neural networks may be used as a modeling approach in speech processing. For example, neural networks may be used in aspects of, e.g., speech recognition, text-to-speech synthesis, and natural language understanding.

A typical speech processing system with capability of communicating with a user may employ a hybrid approach where some of the speech components use classical approaches and other speech components use specialized neural networks. When speech processing systems have multiple neural networks, each neural network may be typically focused on one aspect of speech processing. For example, a speech processing system may employ one or more of: an automatic speech recognition (ASR) neural network that may provide transcriptions of speech into human readable text, a natural language understanding (NLU) neural network that may parse and translate text according to natural language principles, a natural language generator (NLG) neural network that may generate narratives and reports in easy-to-read language, and a text-to-speech (TTS) neural network that may convert text to speech imitating a speaker's voice.

These specialized neural networks may work individually while processing respective inputs, which may lead to overall reduced accuracy and increased latency for processing a speech signal fed to a system employing one or more of these neural networks. There have been efforts to improve accuracy and latency for processing a speech signal, but those efforts have been largely focused on improving accuracy and latency of each individual neural network of the system (e.g., improving accuracy and latency of ASR, NLU, NLG, TTS, or a dialogue manager individually). In general, speech processing systems that focus on improving each component separately (e.g., each neural network (NN) of respective component such as NN of ASR or NN of TTS) may be improved by a relatively small amount due to the law of diminishing returns where a lot of effort must be supplied to improve accuracy by a relatively small percentage.

Speech processing technologies may be used for, e.g., digital speech coding, spoken language dialog systems, text-to-speech synthesis, automatic speech recognition, etc. Speech may provide an intuitive way of accessing information, controlling things, and communicating, as it may be hands-free, eyes-free, fast, and user-friendly. Recently, speech and other types of natural language are experiencing an increased acceptance when being used for interacting with "intelligent" computing systems.

Some speech processing systems may consist of a set of technology components that may be integrated to form a consecutive processing chain, e.g., the components may be connected and executed in a pipeline. FIG. 1 shows such an example speech processing system. Starting on the input side, an automatic speech recognition (ASR) module may produce a hypothesis about the orthographic content of a spoken utterance. A natural language understanding (NLU) module may take this recognized utterance and convert it into a machine-readable command or input dialog act (DA). A dialogue manager (DM) module may process this input DA and send the relevant output DA to a natural language generation (NLG) module or DM that may also generate commands for querying data sources or information sources. The NLG module may then be responsible for converting the output DA into appropriate natural language text. Finally, a text-to-speech (TTS) module may take the text transmitted by the NLG module and covert it to a speech output for a user.

Figure 2A:
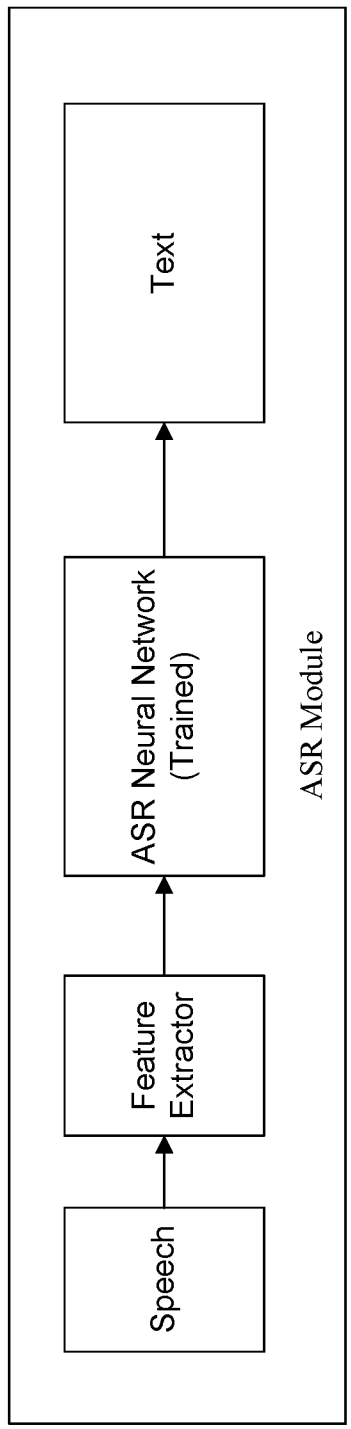
FIGS. 2A-2D are example schematic views of components of the example speech processing system of FIG. 1.
Figure 2B:
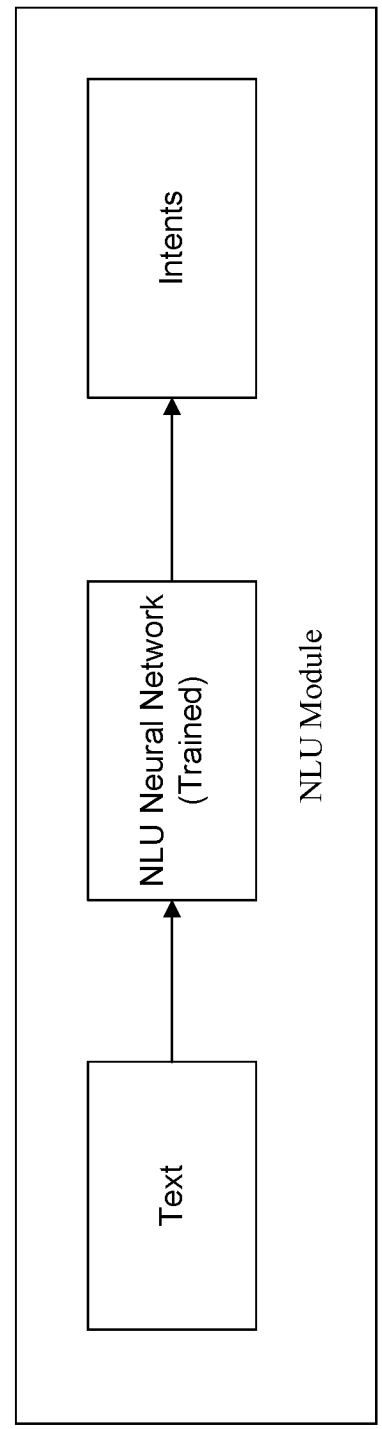
Figure 2C:
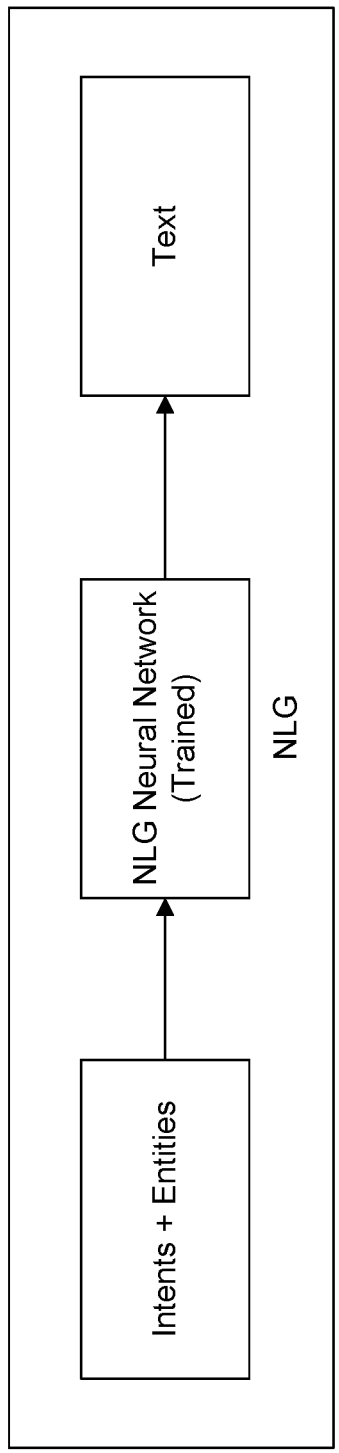
Figure 2D:
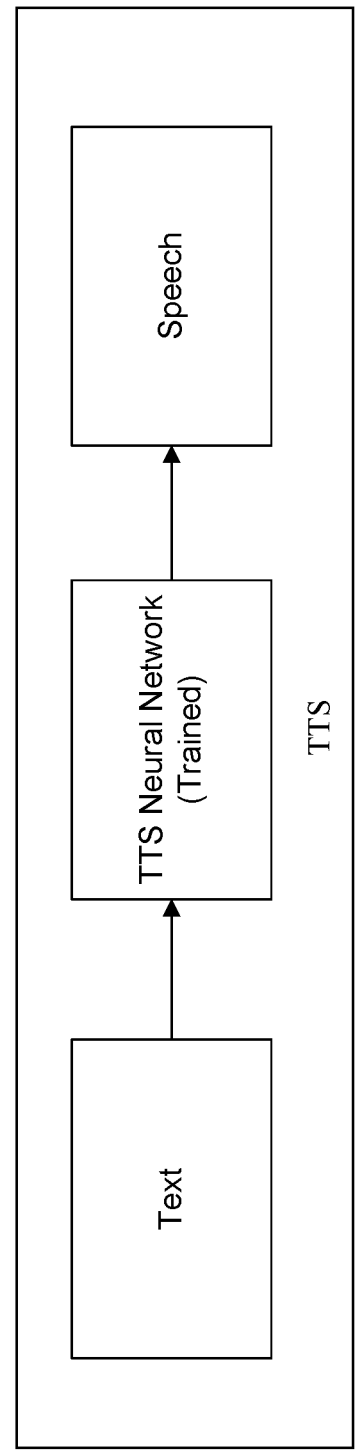

Such speech processing systems may employ multiple specialized neural networks, each of which may focus on one aspect of speech processing. In particular, each of the modules may usually employ one neural network trained for corresponding aspect of speech processing (e.g., each module encompasses a suitable neural network to accomplish at least some functionality of respective module). For instance, as shown in FIG. 2A, the ASR module may include an ASR neural network to take speech as input, extract features therefrom, and provide transcriptions of speech into human readable text. Further, as shown in FIG. 2B, the NLU module may include an NLU neural network that parses text according to natural language principles to generate intents. Further, as shown in FIG. 2C, the NLG module may include an NLG neural network that takes intents and entities as input to generate text, usually with narrative and in easy-to-read language. Finally, as shown in FIG. 2C, the TTS module may include a TTS neural network that converts text to speech imitating a speaker's voice. For some speech processing systems, the components may use a hybrid approach, where each module uses a combination of a neural network and classical implementation. For example, the NLU module may include a neural network (e.g., deep neural network) that may provide part-of-speech tagger functionality and classical implementation for named-entity recognition functionality (e.g., using statistical components such as conditional random fields [e.g., probabilistic graphical model] or support vector machines [e.g., max margin hyperplane classifier]). In another example, a TTS module may include a neural network (e.g., deep neural network) that may provide signal generation functionality or prosody prediction functionality and remaining elements of TTS module may be based on a classical approach (e.g., text pre-processing can be rule-based).

The present disclosure proposes a speech processing system that unifies one or more neural networks required for processing of a speech signal. In some implementations, the disclosed speech processing system may reduce complexity and may reduce errors produced by use of fewer neural networks. In some implementations, the disclosed speech processing system may use one or more unified neural networks to merge or unify a pipeline of multiple tasks in series (e.g., "unified neural network" may be defined generally as a neural network that unifies two or more tasks or functionalities typically handled by separate neural networks, such as a unified neural network that may unify ASR with NLU tasks). As the disclosed speech processing system may merge or unify separate tasks together into one overall task, it may be appreciated that accuracy and latency for processing of the speech signal may be improved since, e.g., there is no need to treat tasks as separate from one another. System Overview:

In some implementations, the present disclosure may be embodied as a system, method, apparatus, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures show the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 3:
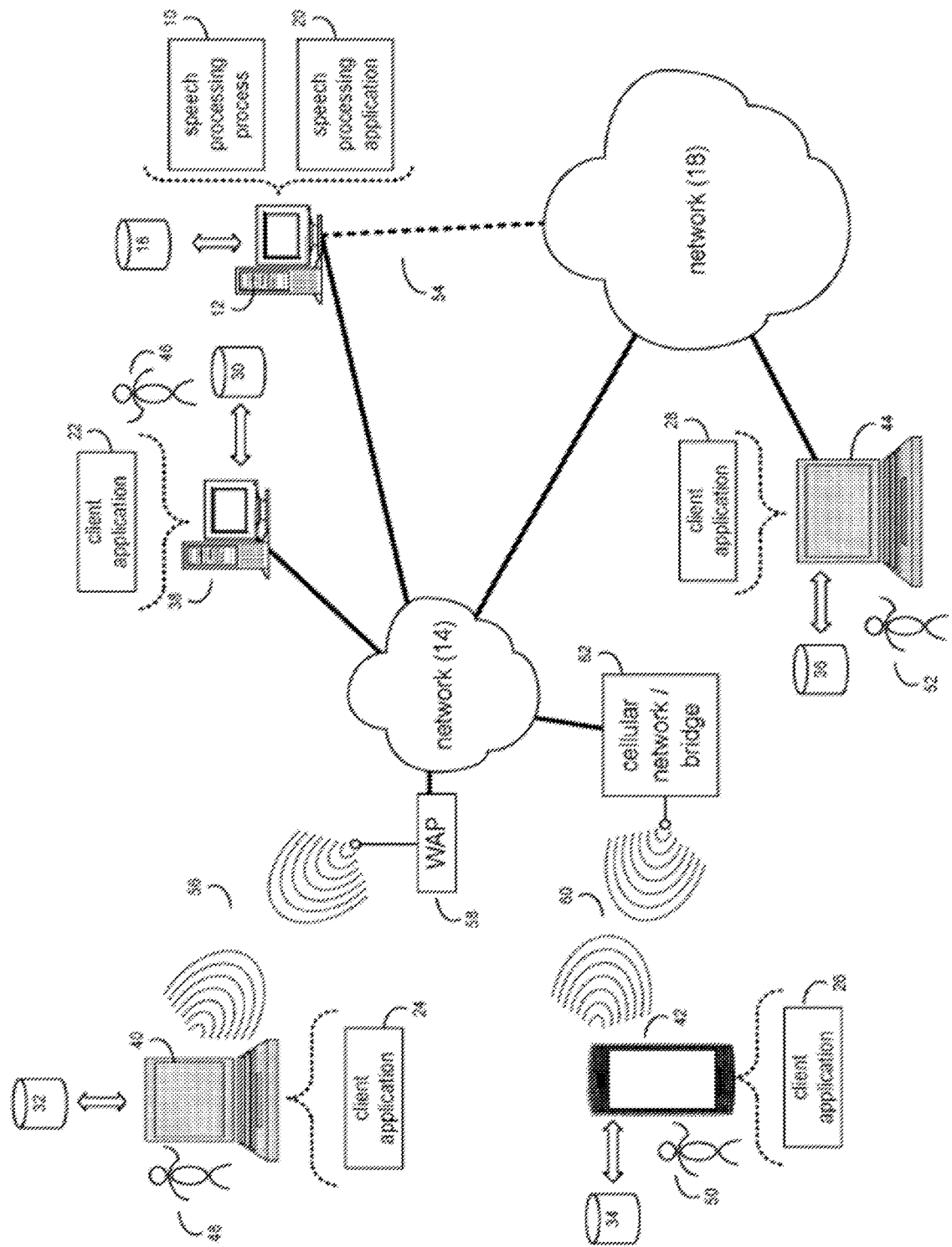
FIG. 3 is an example diagrammatic view of a speech processing process coupled to an example distributed computing network according to one or more example implementations of the disclosure.

Referring now to the example implementation of FIG. 3, there is shown a speech processing process, such as speech processing process 10, that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the instruction sets and subroutines of the speech processing process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, speech processing process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a speech processing application (e.g., speech processing application 20), examples of which may include, but are not limited to, e.g., a web conferencing application, a video conferencing application, a voice-over-IP application, a video-over-IP application, an Instant Messaging (IM)/"chat" application, virtual agent application, digital assistant application. a short messaging service (SMS)/multimedia messaging service (MMS) application, or other application that allows for processing of speech. In some implementations, speech processing process 10 and/or speech processing application 20 may be accessed via one or more of client applications 22, 24, 26, 28. In some implementations, speech processing process 10 may be a standalone application, or may be an applet/application/script/extension that may interact with and/or be executed within speech processing application 20, a component of speech processing application 20, and/or one or more of client applications 22, 24, 26, 28. In some implementations, speech processing application 20 may be a standalone application, or may be an applet/application/script/extension that may interact with and/or be executed within speech processing process 10, a component of speech processing process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of speech processing process 10 and/or speech processing application 20. Examples of client applications 22, 24, 26, 28 may include, but are not limited to, e.g. a standard and/or mobile web browser, an email application (e.g., an email client application), a textual and/or a graphical user interface, a customized web browser, a plugin, an Application Programming Interface (API), an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44

(and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television or smart speaker (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of speech processing process 10 (and vice versa). Accordingly, in some implementations, speech processing process 10 may be a purely server-side application, a purely client-side application, or a hybrid server-side/client-side application that is cooperatively executed by one or more of client applications 22, 24, 26, 28 and/or speech processing process 10.

In some implementations, one or more of client applications 22, 24, 26, 28 may be configured to effectuate some or all of the functionality of speech processing application 20 (and vice versa). Accordingly, in some implementations, speech processing application 20 may be a purely server-side application, a purely client-side application, or a hybrid server-side/client-side application that is cooperatively executed by one or more of client applications 22, 24, 26, 28 and/or speech processing application 20. As one or more of client applications 22, 24, 26, 28, speech processing process 10, and speech processing application 20, taken singly or in any combination, may effectuate some or all of the same functionality, any description of effectuating such functionality via one or more of client applications 22, 24, 26, 28, speech processing process 10, speech processing application 20, or combination thereof, and any described interaction(s) between one or more of client applications 22, 24, 26, 28, speech processing process 10, speech processing application 20, or combination thereof to effectuate such functionality, should be taken as an example only and not to limit the scope of the disclosure.

In some implementations, one or more of users 46, 48, 50, 52 may access computer 12 and speech processing process 10 (e.g., using one or more of client electronic devices 38, 40, 42, 44) directly through network 14 or through secondary network 18. Further, computer 12 may be connected to network 14 through secondary network 18, as shown with phantom link line 54. Speech processing process 10 may include one or more user interfaces, such as browsers and textual or graphical user interfaces, through which users 46, 48, 50, 52 may access speech processing process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 4:
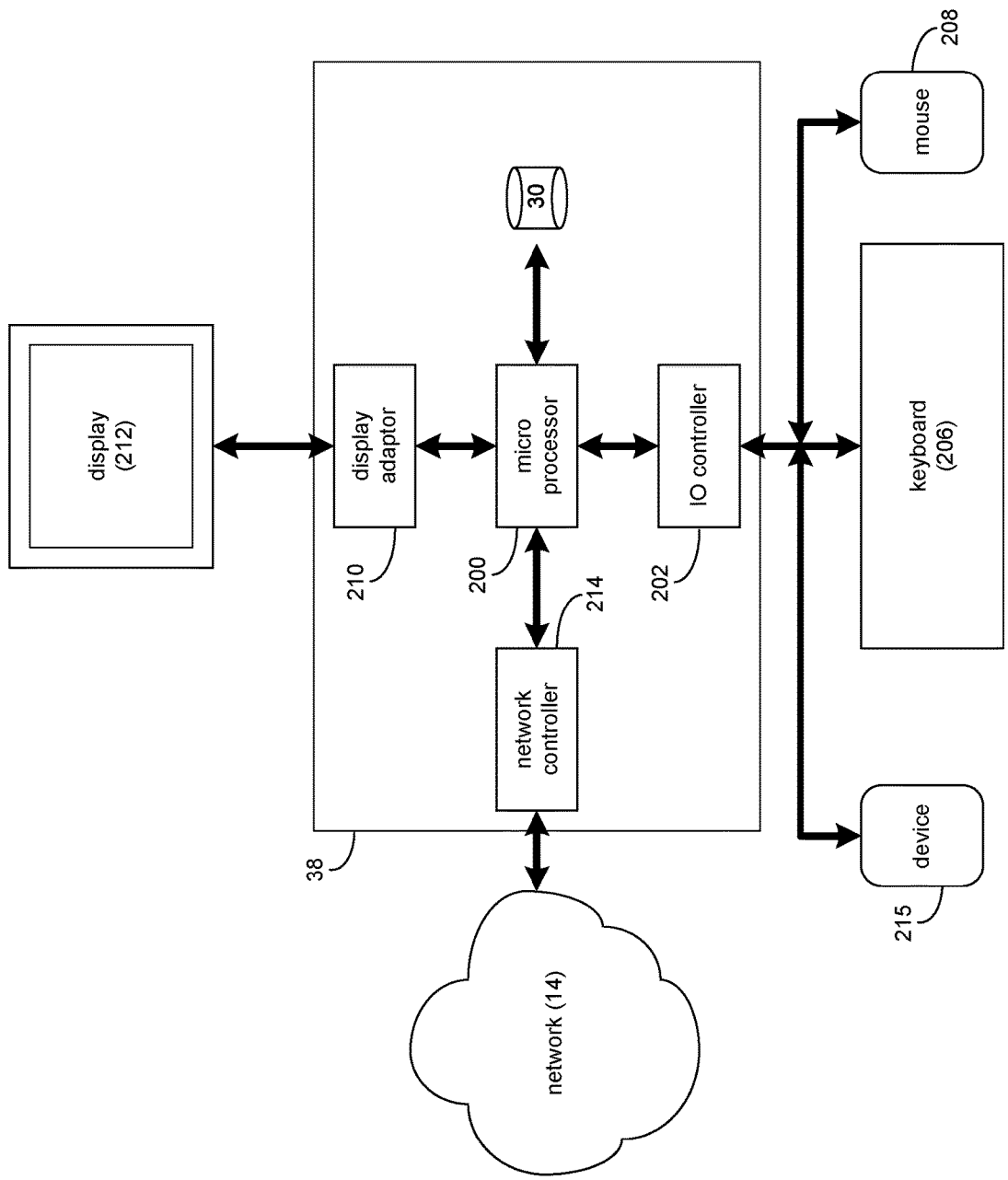
FIG. 4 is an example diagrammatic view of a client electronic device of FIG. 3 according to one or more example implementations of the disclosure.

Referring also to the example implementation of FIG. 4, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, speech processing process 10 may be substituted for client electronic device 38 (in whole or in part) within FIG. 4, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, the speech processing process 10 may at least help, e.g., improve existing technological processes associated with, e.g., processing of speech signals necessarily rooted in computer technology.

It will be appreciated that the computer processes described throughout are not considered to be well-understood, routine, and conventional functions.

The Speech Processing Process:

As discussed above and referring also at least to the example implementations of FIGS. 5A-16, a speech processing system 500 (which may include speech processing process 10 to execute one or more features of speech processing system 500) may utilize one or more unified neural networks (UNNs) for implementing various stages of processing a speech signal. A unified neural network according to one or more example implementations of the present disclosure may be a well-trained neural network that is trained on datasets that may be derived from individual training datasets of the individual network for training of all the neural networks (with same or different architectures)

together. In an example, the unified neural network may be trained as a complete network where training data may be from a new dataset that is for specific tasks. These specific tasks may include such things as providing at least two or more of some of the following functionalities internally: Dialog Manager (DM) functionality (e.g., DM response to speech input as output such as speech input and DM response as text output or speech input and DM response as speech output, DM query response, etc.), TTS functionality, ASR functionality, NLU functionality, NLG functionality, etc. that may be performed by the neural network. A unified neural network may adjust weights during training, effectively producing a compact model (also referred to as a trained network) that may run original tasks in a pipeline. As the unified neural network may be trained in one end-to-end flow, it may simplify previously done tasks of individually training each of the networks that sometimes led to inconsistencies due to different goals for each neural network. For example, inconsistencies may occur where an automatic speech recognition (ASR) module trained on general domain (e.g., no specific domain) cannot be used with an NLU module that has a specific task (e.g., task of identifying names of chemical compounds). As a result, the training of the unified neural network as an end-to-end flow may substantially reduce mismatch between individual tasks (e.g., ASR and NLU) and thus may help shorten the system development time.

Figure 5A:
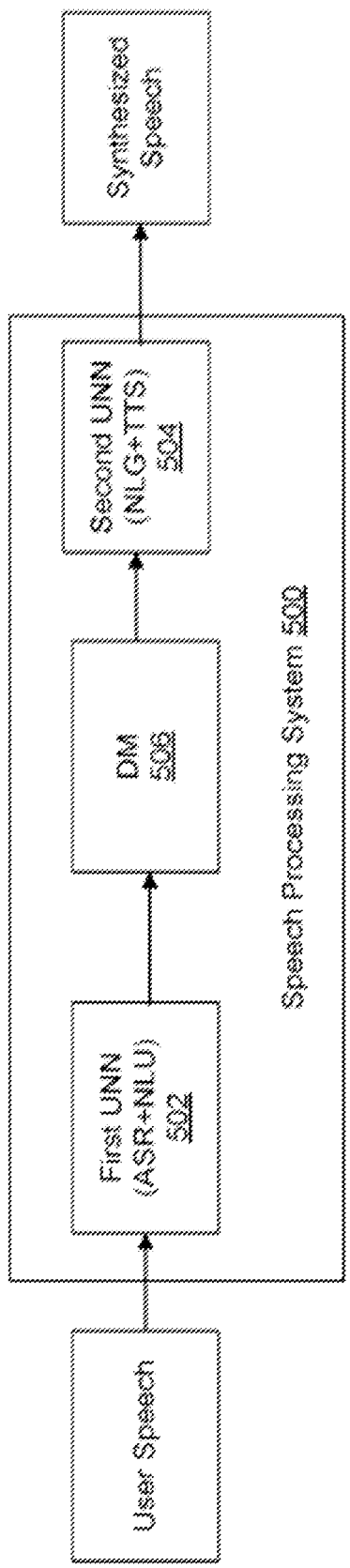
FIGS. 5A and 5B are example schematic views of a speech processing system in operation according to one or more example implementations of the disclosure.
Figure 5B:
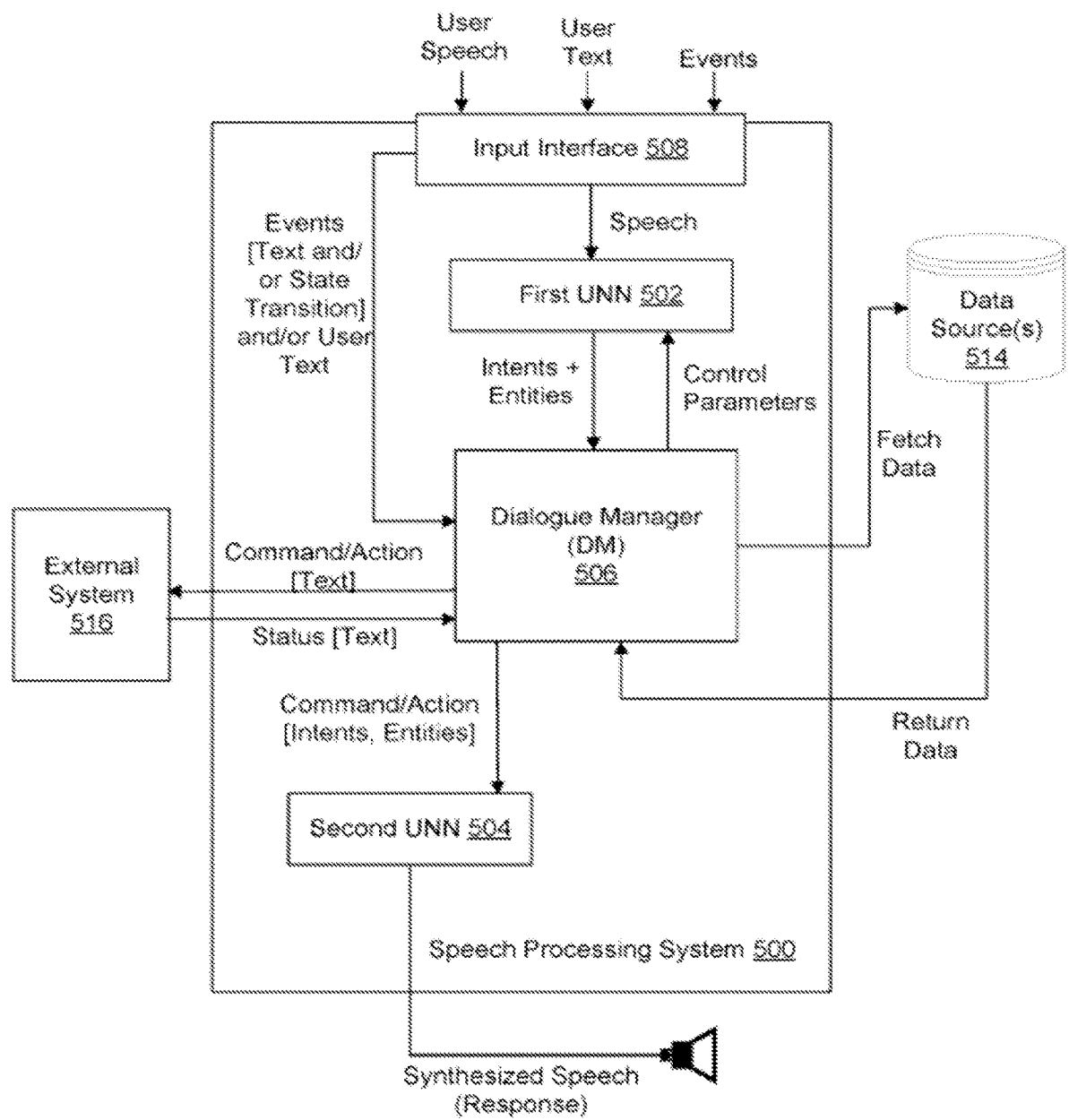

FIGS. 5A and 5B show example schematic views of a speech processing system 500 in operation for enabling communication with a user, according to one or more example embodiments of the present disclosure. As shown more clearly in FIG. 5A, the speech processing system 500 may include, e.g., at least two unified neural networks: a first unified neural network 502 (e.g., which may be executed by speech processing process 10) and a second unified neural network 504 (e.g., which may be executed by speech processing process 10). Further, the speech processing system 500 may include a dialogue manager (DM) 506 (e.g., which may be executed by speech processing process 10).

Further, as shown in example FIG. 5B, the speech processing system 500 may include an input interface 508 (e.g., which may be executed by speech processing process 10) to receive user input. In some implementations, the user input may be in the form of user speech, which is generally a speech signal that needs to be captured and processed to provide a speech output for enabling communication with the user. For this purpose, the input interface 508 may be implemented as a microphone or any other sound capturing device. In some implementations, the input interface 508 may receive user text messages from the user that may need to be processed to generate a speech output. For this purpose, the input interface 508 may be implemented as a chat application or the like. In some examples, the user input may be a combination of user speech and user text messages without any limitations. Further, in some examples, the user input may also include events (e.g., may include one or more of internal events such as database response or component response like success, delay, failure, etc. and/or one or more external events such as user interaction like user interface (UI) messages, user speak input, user text input, etc.) that may be in the form of text and/or DM state transition (e.g., when the event is in DM state transition form, the event may cause the DM 506 to update its current state to another state). The events may be received from an external data source (e.g., database, event generator, timer, UI interactions, or other components that generate component messages). In some examples, the events may help to analyze the user speech and/or user text messages at a location of specific detectable DM state transition conditions during processing thereof, where each analyzed portion may be considered to have a single class identity. For example, where events are received along with user speech and/or user text messages, the DM 506 may use information in events for generating control parameters (as explained in examples below) for directing the first unified neural network 502 in analyzing the user speech (e.g., in the form of one or more entities) and/or user text based on the single class identity. The input interface 508 may direct speech to a first unified neural network 502 (where the speech may be processed and converted into intents and entities for the DM response) and may direct events and/or text to a dialogue manager (DM) 506 for the DM response. The DM 506 may be able to efficiently generate an appropriate response for events and/or text forwarded directly from the input interface 508 (e.g., events and/or text do not need to be processed by the first unified neural network 502). However, in the disclosed example (as shown in FIG. 5B), the DM 506 may require that speech be converted to intents and entities (e.g., converted by first unified neural network 502) for the DM 506 to understand and then the DM may generate an appropriate response to these intents and entities.

Figure 6:
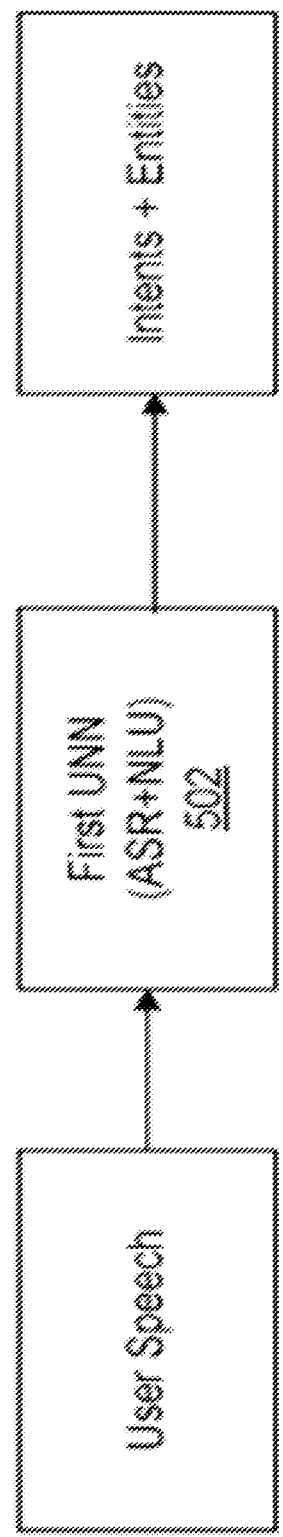
FIG. 6 is an example schematic view of a first unified neural network of the speech processing system in operation, according to one or more example implementations of the disclosure.

FIG. 6 shows an example schematic view of an operation of the first unified neural network 502 (e.g., which may be executed by speech processing process 10) with speech, according to one or more example implementations. The first unified neural network 502 may include an automatic speech recognition (ASR) section and a natural language understanding (NLU) section configured to process the received speech signal to extract one or more of intents and entities. As shown, the first unified neural network 502 may take in the speech (e.g., a speech signal) as input, and may output one or more of intents and entities.

Generally, "entity" may refer to a variety of different types of entities where each "entity" may be broadly described as a number of objects having the same or similar characteristics. In other words, entities may be lists of keywords defining objects of one class (e.g., person, organization, location, automobile, name of place, food, etc.). In one example, an entity may refer to a keyword and a set of its synonyms. In another example, an entity may refer to a keyword and a set of its definitions. In yet another example, an entity may refer to a list (e.g., a list of cities, list of names, list of titles, list of brands, list of street names, etc.). In another example, an entity may refer to two or more entities and their relationship to one another. Entities may broadly refer to simple entities, list entities, prebuilt entities, regular expression entities, and the like. For example, each simple entity may be a machine-learned value that may be a word or phrase. Each list entity may represent a fixed, closed set of related words along with their synonyms. Each prebuilt entity may be discovered based on a regular expression. In some examples, the entities may be composite entities where each composite entity may be made of other entities such as one or more of prebuilt entities, simple entities, regular expression entities, and list entities. Composite entities may refer to two or more entities and their relationship to one another. Composite entities may equate to simple entities when there are no composites (e.g., no two or more entities such as "car" by itself may be composite entity with no composites equating to simple entity "car" whereas "red car" may be composite entity with composites "red" and "car" that may relate to each other such that "car" may be "red" in color).

Generally, "intent" may be broadly described as including a dialog system interaction scheme, which may provide a particular relationship between a user request and a dialog system response (as discussed in subsequent paragraphs). In some embodiments, intent may be determined (e.g., via speech processing process 10) as a pattern that may explicitly include one or more references for entities. An example pattern may be "what is the weather in City X", where "City X" may refer to entity "City" and parameter city inside the entity "X". In some examples, the intents may be part of a hierarchy. For example, the first unified neural network 502 may extract intents that may be part of a hierarchy. In another example, the first unified neural network 502 may extract composite entities which may be nested in an example (e.g., "green sports car"). Use of hierarchical intents and/or composite entities may provide semantics as well as syntactic information.

Figure 7:
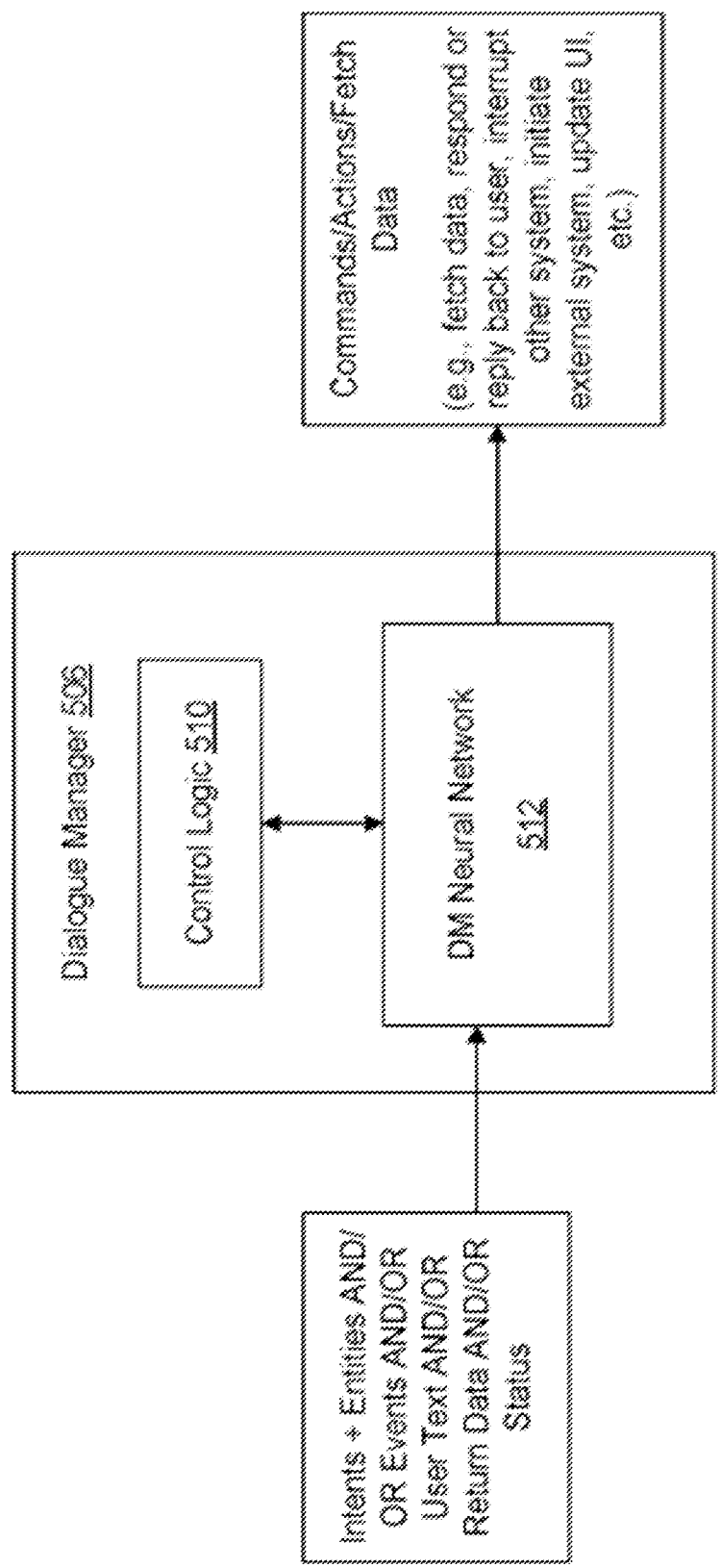
FIG. 7 is an example schematic view of a dialogue manager of the speech processing system in operation, according to one or more example implementations of the disclosure.

FIG. 7 shows an example schematic view of the dialogue manager 506 (e.g., which may be executed by speech processing process 10), according to one or more example embodiments. The dialogue manager 506 may be configured to analyze the extracted intents and entities to generate an appropriate (e.g., correct) dialogue response (e.g., a partially observable Markov decision process (POMDP) may be used as a statistical technique, neural networks may be used, and/or hard coded rules may be used to accomplish this analysis). The dialogue manager 506 may receive the extracted intents and entities from the first unified neural network 502. The dialogue manager 506 may additionally receive or alternatively receive events (e.g., in the form of text and/or state transition). The dialogue manager 506 may serve as an interface between the user and a server (e.g., with one or more unified neural networks) processing the speech signal. The dialogue manager 506 may supply user requests to the server and may process the resulting responses received from the server. The dialogue manager 506 may determine, for example, an appropriate question to ask the user in order to resolve ambiguities that may arise in execution of a user request in the application. For this example purpose, as shown in FIG. 7, the dialogue manager 506 may include a control logic 510 (e.g., which may be executed by speech processing process 10) and a dialogue manager (DM) neural network 512 (e.g., which may be executed by speech processing process 10). The control logic 510 may use the DM neural network 512 to provide a command/action (e.g., dialogue response such as dialogue responding to question from user, dialogue asking user a question, etc.) based on the received input of intents and/or entities, and/or events, and/or user text. The command/action (e.g., response) may include one or more of the following: e.g., fetch data, respond or reply back to user (text format) using natural language functionality, initiate external systems, interrupt other systems, update a user interface (UI), etc. The command/action may be in the form of abstract language (e.g., abstract queries or abstract instructions on execution) that may be interpreted to generate queries or other actions.

Referring to the example of FIGS. 5B and 7 in combination, the dialogue manager 506 may receive the inputted events (e.g., in the form of text and/or DM state transitions) from the input interface 508. For example, the input interface 508 may be configured to receive one or more events and transmit the received one or more events to the dialogue manager 506. The control logic 510, of the dialogue manager 506, may generate control parameters (e.g., commands for changing language models, commands for loading different domain models, or commands for modifying input usually appended user input with these parameters) for the first unified neural network 502 based on the received one or more events (e.g., by processing the received events that may include text and/or state transition) and/or user text. The first unified neural network 502 may implement and/or use one or more models for processing the speech signal received from the input interface 508. The one or more models may be used and/or implemented based on the control parameters. These one or more models may refer to graph models or specific types of neural networks (e.g., "noisy" neural network for addressing noisy environment). In some examples, the first unified neural network 502 state may change (e.g., some nodes of network may change state such active to inactive or inactive to active) based on the control parameters (e.g., may indicate noisy environment or non-noisy environment). For example, in some implementations, the first unified neural network 502 may select and load one or more models, from multiple models, for processing the speech signal based on the generated control parameters. In some implementations, the first unified neural network 502 may adjust currently one or more loaded models for processing the speech signal based on the generated control parameters. In some implementations (e.g., where no events and/or user text is received), the first unified neural network may select and load one or more models for processing the speech signal to intents, entities without a control parameter. Further, for this same example, the dialogue manager 506 may generate control parameters based on the generated intents, entities as feedback to re-run the first unified neural network 502 to generate an improved set of intents, entities (e.g., append the input with a DM generated control message or load another model and re-run the input). Further, in some examples, the dialogue manager 506 may determine a domain and then may direct other components to load domain specific models (related to determined domain) resulting in higher accuracy. "Domain" may be generally described as targeted lexicon vocabulary and comments that relate to a specific category of dialogue (e.g., restaurants, sales, sports, etc.). The dialogue manager 506 may re-run the first unified neural network 502 with the domain specific models which may have additional detailed information about the domain.

Further, in the dialogue manager 506, the DM neural network 512 may analyze the received one or more of intents and entities. The DM neural network 512 may determine, for example, an appropriate question to ask to the user to resolve ambiguities that may arise in execution of a user request based on the received intents and entities. The DM neural network 512 and/or the control logic 510 may further fetch data from external data source(s) 514 to determine a proper response to the user's queries. For example, the DM neural network 512 may fetch data (e.g., by generating commands relating to fetching data) from an external database. The commands (e.g., abstract commands) from the dialogue manager may be interpreted by the control logic 510 (e.g., interpreted as a database (DB) query) and then may proceed with query action. For example, if the user query is "How is the weather?", the DM neural network 512 may query external data source(s) 514, such as a weather service, to fetch current weather data. The fetched data may be returned from the external data source(s) 514 to the DM neural network 512 to generate a response with details about the current weather, such as "It's sunny today". In another example, if the user query is "How will be the weather?", the DM neural network 512 may generate a question to ask the user, such as "For what day would you like to know about the weather?" or the like based on the analyzed one or more of intents and entities, as derived from the first unified neural network 502 after processing the user's query. As described above, the DM neural network 512 may use the returned data as part of the query in answering questions. In some implementations, the DM neural network 512 may use the returned data for analyzing extracted intents and entities to generate an appropriate dialogue response (e.g., fulfill request or provide an answer to user question). In some examples, the dialogue manager may fetch data from an external database (e.g., by generating abstract queries that may be interpreted to generate queries). The returned data may be used for analyzing the extracted intents and entities to generate the appropriate dialogue response. In some examples, commands from the dialogue manager may be interpreted if they are database (DB) query requests, responses to user actions, other actions, or the like.

In some implementations, the DM neural network 512 may communicate with the control logic 510 to output a command/action (e.g., in text form) by the dialogue manager 506, to be executed by an external system (e.g., via speech processing process 10), such as an external system 516. In some implementations, the external system 516 may be, for example, a related Artificial Intelligence (AI) based agent, another speech system, a software application, or some other external system. Commands/actions for the external system 516 (e.g., related AI agent) may be for tasks such as writing an email, phone call, setting up a meeting, controlling home automation products, etc. For example, the user's speech may include an instruction, such as "Turn ON light"; in such case, the command/action may be a remote signal to a smart light to be turned "ON". The dialogue manager 506 may further receive status of execution of the command/action from the external system 516, like whether the external system 516 was successful in turning "ON" the light, or failed to do so due to some reason (e.g., connectivity issue or the like). The status may be communicated back to the dialogue manager 506, for example, usually in the form of text. Further, the dialogue manager 506 may communicate a generated command/action (e.g., in the form of intents, entities) relating to a dialogue response (e.g., status of action or answer to question) to the user in the form of speech by utilizing the second unified neural network 504, as described in the subsequent paragraphs. In other examples, the dialog response may be communicated to the user in the form of text.

Figure 8:
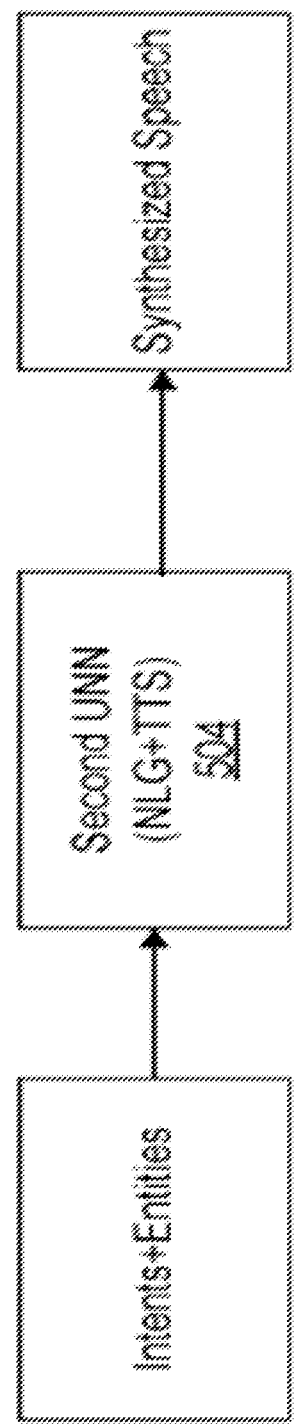
FIG. 8 is an example schematic view of a second unified neural network of the speech processing system in operation, according to one or more example implementations of the disclosure.

Again, referring to FIG. 5B, the dialogue manager 506 may communicate the command/action (e.g., providing the dialogue response such as status of execution thereof) in the form of generated one or more of new intents and entities to the second unified neural 504. FIG. 8 shows an example schematic view of an operation of the second unified neural network 504. The second unified neural network 504 may include a natural language generator (NLG) section and a text-to-speech (TTS) section that may be configured to generate a speech output corresponding to the appropriate dialogue response for the user. In some implementations, the control logic 510 may forward the command/action information (e.g., including intents, entities) from the dialogue manager 506 to the second unified neural network 504 to synthesize speech response or load new models to synthesize speech response. As shown, the second unified neural network 504 may take in one or more of the intents and entities as input (as received from the dialogue manager 506) and may generate speech as an output. In some implementations, the speech output may be a response to a user's query, a status confirmation of a user's command, a combination thereof, another type of dialogue response, or the like.

In some embodiments, the ASR section of the first unified neural network 502 may convert the speech signal into a first network state (e.g., in the form of feature vectors that may represent intermediate text information, word sequence vectors that may represent intermediate text information, outputs of an automatic speech recognition (ASR) process, outputs of an automatic speech recognition (ASR) neural network, or data from an end or resulting section of an automatic speech recognition (ASR) neural network that may be in vector form or another form as appreciated by one of skill in the art) and the NLU section of the first unified neural network 502 may extract the one or more of intents and entities from the first network state. For example, parsing intents and entities may be an example of shallow semantic parsing performed by a neural network where entities may be identified (also known as slot-filling or frame semantic parsing). In another example, the first unified neural network 502 may use deep semantic parsing (also known as compositional semantic parsing) to produce precise meaning representations of utterances e.g., where entities may be convoluted, nested, or a composite in nature. Where it may be difficult to understand user intent by extracting intents and entities only, the first unified neural network 502 may further determine relationship between intents and entities (e.g., by using deep semantic parsing) such that these relationships may be provided to other neural networks or portions of the same neural network for improved understanding. Based on relationships, deep semantic parsing may generate a formal meaning representation language of the original utterance. Further, the NLG section of the second unified neural network 504 may be configured to generate a second network state (e.g., in the form of vectors that may represent a natural language generation response or natural language response, decoder hidden state vectors that may represent natural language generation, feature vectors that may represent natural language generation, outputs of a natural language generation process, outputs of a natural language generation neural network, or data from an end or resulting section of a natural language generation neural network that may be in vector form or another form as appreciated by one of skill in the art) corresponding to the appropriate dialogue response. The TTS section of the second unified neural network 504 may be configured to convert the second network state into the speech output. The structure of the disclosed unified neural networks 502 and 504, and process of generating intermediate network states (e.g., such as the first network state and/or the second network state) may be explained in more detail with reference to examples shown in FIGS. 12 and 13, respectively.

Figure 9A:
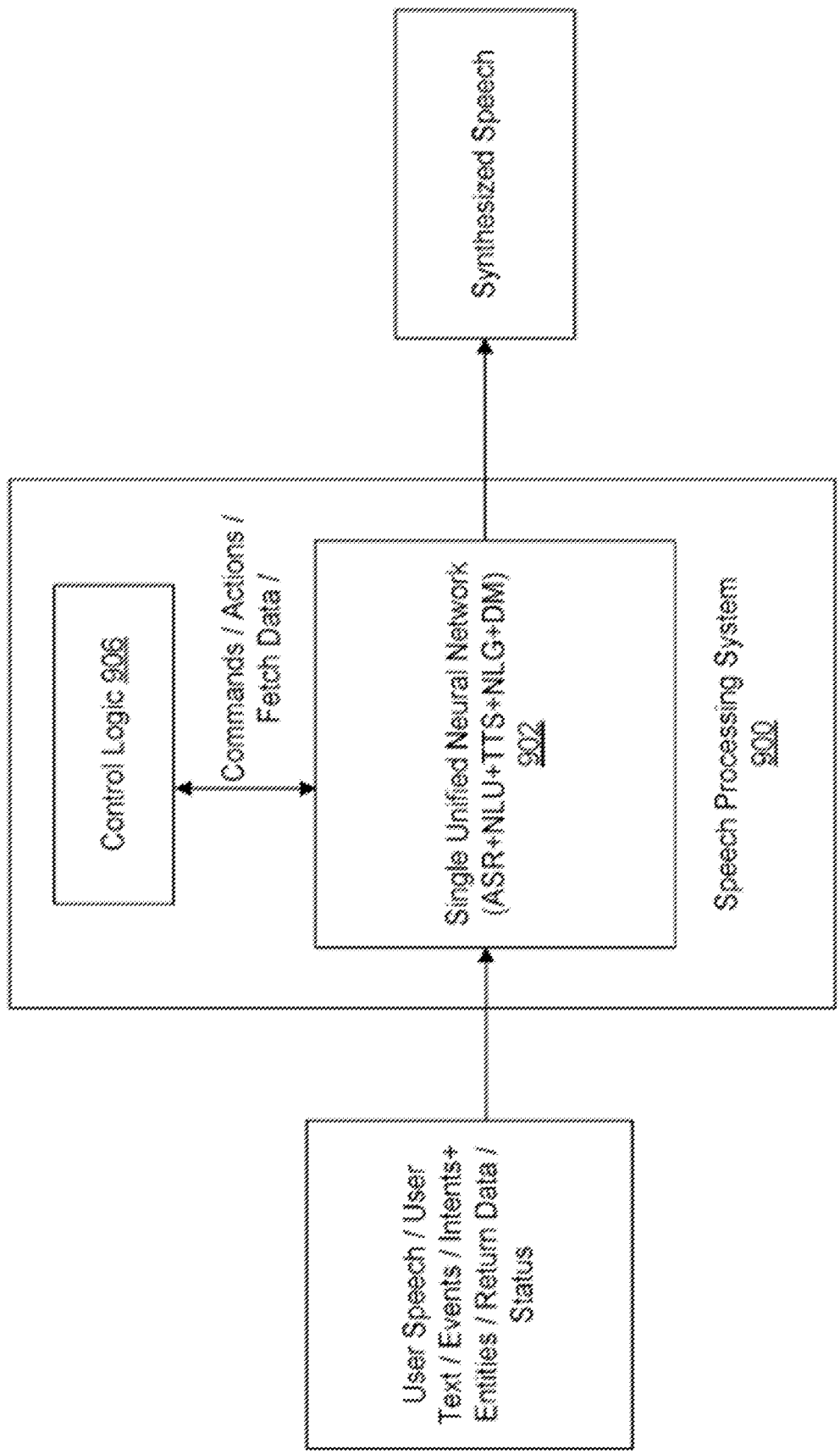
FIGS. 9A and 9B are example schematic views of a speech processing system in operation, according to one or more example implementations of the disclosure.
Figure 9B:
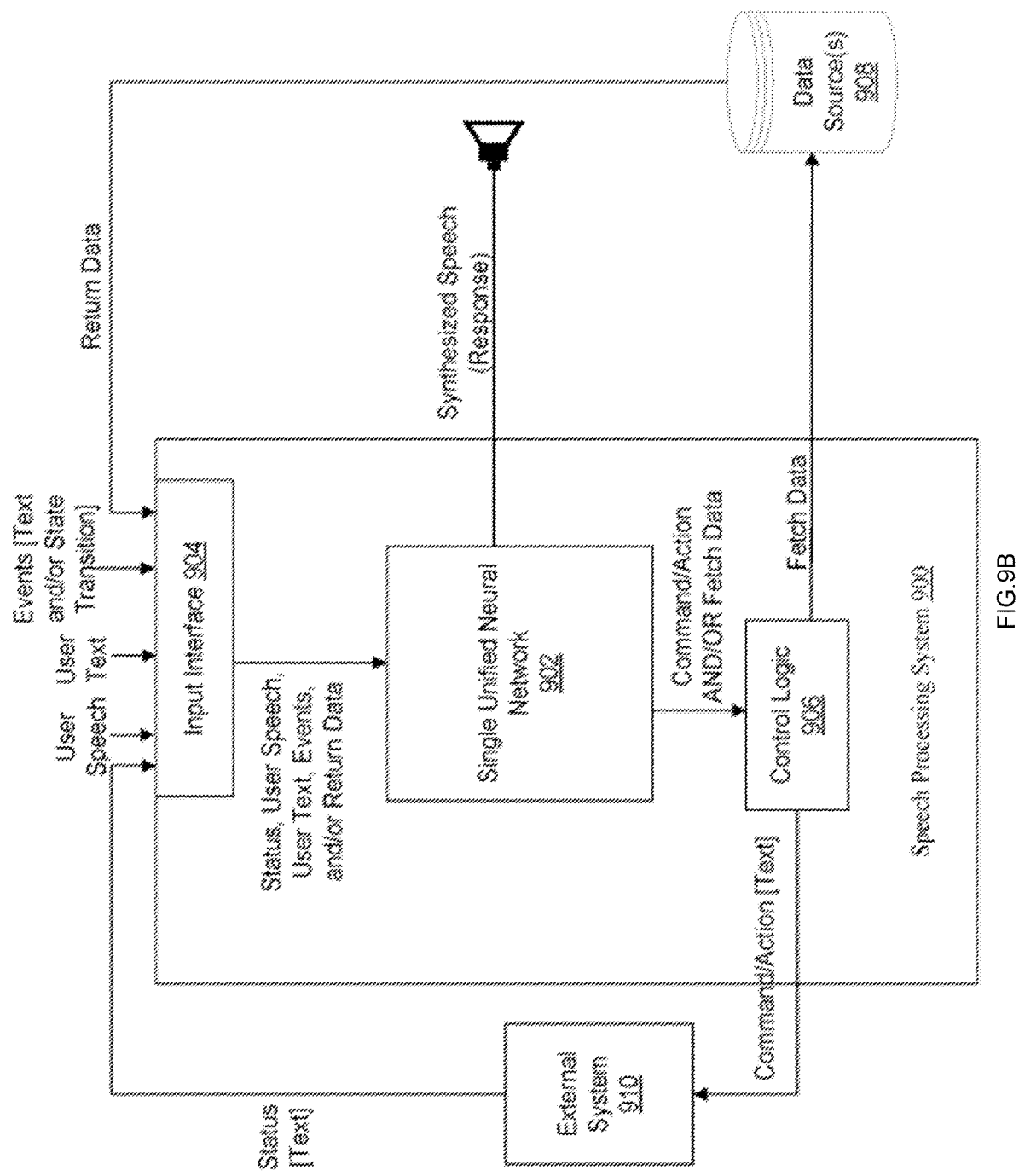

FIGS. 9A and 9B show example schematic views of a speech processing system 900 (e.g., which may be executed by speech processing process 10) in operation for enabling communication with a user, according to an example embodiment of the present disclosure. In the disclosed embodiment, as shown in FIG. 9A, the speech processing system 900 may include a single unified neural network 902. In some implementations, the single unified neural network 902 may include an automatic speech recognition (ASR) section configured to convert the speech signal into a first network state. The single unified neural network 902 may also include a natural language understanding (NLU) section configured to extract the one or more of intents and entities from the first network state. The single unified neural network 902 may further include a natural language generator (NLG) section configured to generate a second network state corresponding to the appropriate dialogue response. The single unified neural network 902 may further include a text-to-speech (TTS) section configured to convert the second network state into the speech output. The single unified neural network 902 may further include a dialogue manager section configured to fetch data (e.g., by generating commands relating to fetching data such as abstract commands) from a data source 908 (e.g., an external database) (e.g., as part of queries in answering questions and/or for analyzing extracted intents and entities to generate the appropriate dialogue response). For example, the commands from the dialogue manager section may be interpreted by the control logic 906 (like control logic 510) e.g., commands may be interpreted as a database (DB) query and then may proceed with query action. The dialogue manager section may use control logic 906 to instruct the external system 910 (e.g., via control logic 906) using command/action (as described above with respect to the DM neural network 512).

As shown in example FIG. 9B, the speech processing system 900 may include an input interface 904 to receive user input and other inputs. Similar to above, user input may include user speech and/or user text messages. The input interface may also receive communications (e.g., status, events, and/or return data) from external components (e.g., external database, external system 910, external data source(s) 908, etc.). In some implementations, the input interface 904 (and the corresponding received inputs) may be similar to the input interface 508 of FIG. 5B.

Similar to above, the single unified neural network 902 may process the received speech signal to extract one or more of intents and entities. The single unified neural network 902 may further analyze the extracted intents and entities to generate an appropriate dialogue response. The single unified neural network 902 may also generate commands/actions and may synthesize speech.

In some implementations, as shown in example FIGS. 9A and 9B, the speech processing system 900 may include the control logic 906 to support the dialogue manager section, of the single unified neural network 902, for fetching data from a data source (e.g., external database such as data source(s) 908) and may further execute commands/actions for an external system 910. The control logic 906 may support the dialogue manager as required for processing the speech signal. For this purpose, the control logic 906 may be disposed in communication with external data source(s) 908 and to external system 910, similar to the control logic 510 as discussed in reference to FIGS. 5B and 7. As described above, the single unified neural network 902 may also synthesize speech in responding to one or more user input(s). The structure of the disclosed single unified neural network 902 and process of generating intermediate network states are described in more detail with reference to example FIG. 14.

Figure 10:
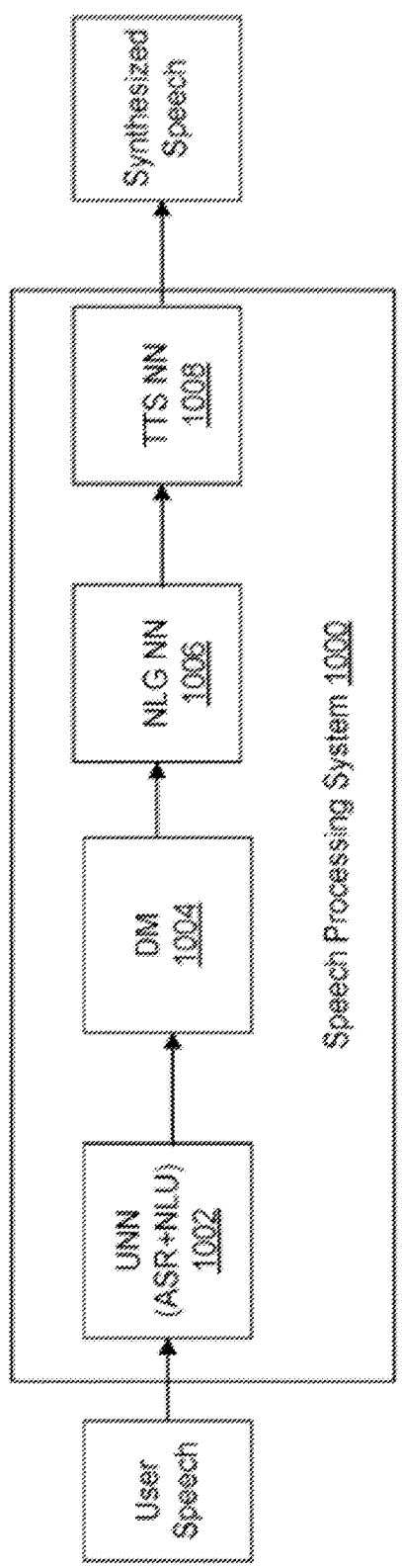
FIG. 10 is an example schematic view of a speech processing system for enabling communication with a user, according to one or more example implementations of the disclosure.

FIG. 10 shows an example schematic view of a speech processing system 1000 (e.g., which may be executed by speech processing process 10) in operation for enabling communication with a user, according to one or more example embodiments of the present disclosure. The speech processing system 1000 may include an input interface (similar to input interfaces described above) configured to receive a speech signal. In some implementations, as shown, the speech processing system 1000 may include a unified neural network 1002 having an automatic speech recognition (ASR) section and a natural language understanding (NLU) section configured to process the received speech signal to extract one or more of intents and entities. In some implementations, the ASR section may be configured to convert the speech signal into a network state (e.g., first network state that may represent intermediate text information or other first network stated as appreciated by one of skill in the art) and the NLU section may be configured to extract the one or more of intents and entities from the network state. Further, the speech processing system 1000 may include a dialogue manager 1004 configured to analyze the extracted intents and entities (from unified neural network 1002) to generate an appropriate dialogue response. The speech processing system 1000 may also include a natural language generator (NLG) based neural network 1006 configured to generate a natural language text response (e.g., in text format) corresponding to the appropriate dialogue response (e.g. based on intents and entities received from dialogue manager 1004). The speech processing system 1000 may include a text-to-speech (TTS) based neural network 1008 that may be configured to convert the natural language text response into the speech output.

Figure 11:
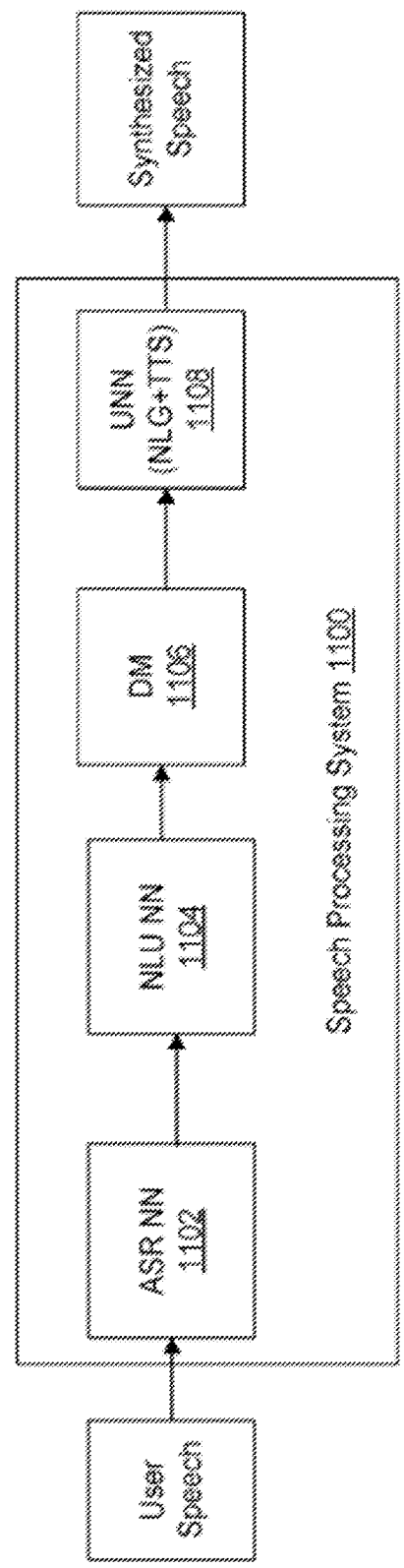
FIG. 11 is an example schematic view of a speech processing system for enabling communication with a user, according to one or more example implementations of the disclosure.

FIG. 11 shows an example schematic view of operation of a speech processing system 1100 (e.g., which may be executed by speech processing process 10) for enabling communication with a user, according to one or more example embodiments of the present disclosure. The speech processing system 1100 may include an input interface (similar to input interfaces described above) configured to receive a speech signal. In some embodiments, the speech processing system 1100 may include an automatic speech recognition (ASR) based neural network 1102 configured to convert the speech signal into text information. The speech processing system 1100 may include a natural language understanding (NLU) based neural network 1104 configured to extract the one or more of intents and entities from the text information. The speech processing system 1100 may include a dialogue manager 1106 configured to analyze the extracted intents and entities to generate an appropriate dialogue response. The speech processing system 1100 may also include a unified neural network 1108 having a natural language generator (NLG) section and a text-to-speech (TTS) section configured to generate a speech output corresponding to the appropriate dialogue response for the user. In some implementations, the NLG section may be configured to generate a network state (e.g. second network state that may represent a natural language generation response or a natural language response) corresponding to the appropriate dialogue response and the TTS section may be configured to convert the network state into the speech output.

It shall be appreciated by a person skilled in the art that a speech processing system may rely on probabilistic language models. The core of a probabilistic language model may be to assign a probability to a sentence by, e.g., Markov Assumption. Due to the nature of sentences that may consist of different numbers of words, a neural network (e.g., a recurrent neural network (RNN)) may be naturally introduced to model the conditional probability among words. Many aspects of speech processing may be handled by a neural network such as a recurrent neural network (RNN). Specifically, some aspects may utilize a long short-term memory (LSTM) type of RNN that involves a deep learning method. In one or more example embodiments, the unified neural networks may implement one or more bi-directional long short-term memory (LSTM) neural networks. In another example, other recurrent neural networks (RNNs) may be used such as transformer neural networks. The transformer neural networks may address issues of sequence transduction or neural machine translation with respect to various tasks (e.g., speech recognition, natural language understanding, natural language generation, text-to-speech transformation, dialogue manager functionality, etc.). Other neural networks including other RNNs may be used as appreciated by one of skill in the art. Conventional RNNs may suffer from "gradient vanishing" or "exploding issues," and further may only handle fixed length problems, and thus may have limited potential for speech processing. To help address this, in one or more embodiments, the described speech processing systems of the present disclosure may utilize one or more bi-directional Long Short Term Memory (LSTM) neural networks, for example purposes only, which will be explained in more detail below.

Figure 12:
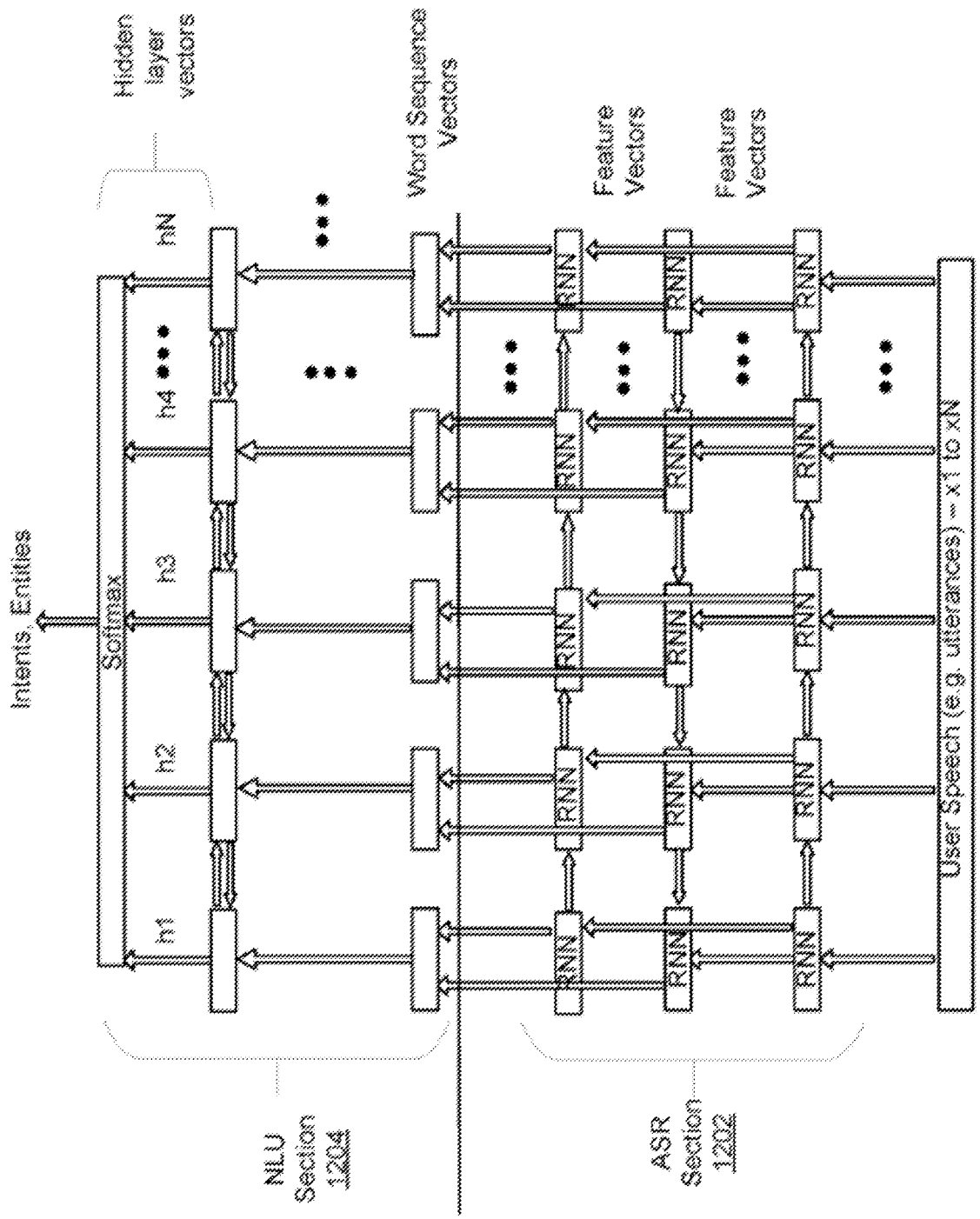
FIG. 12 is an example schematic of a first unified neural network in operation, according to one or more example implementations of the disclosure.
Figure 13:
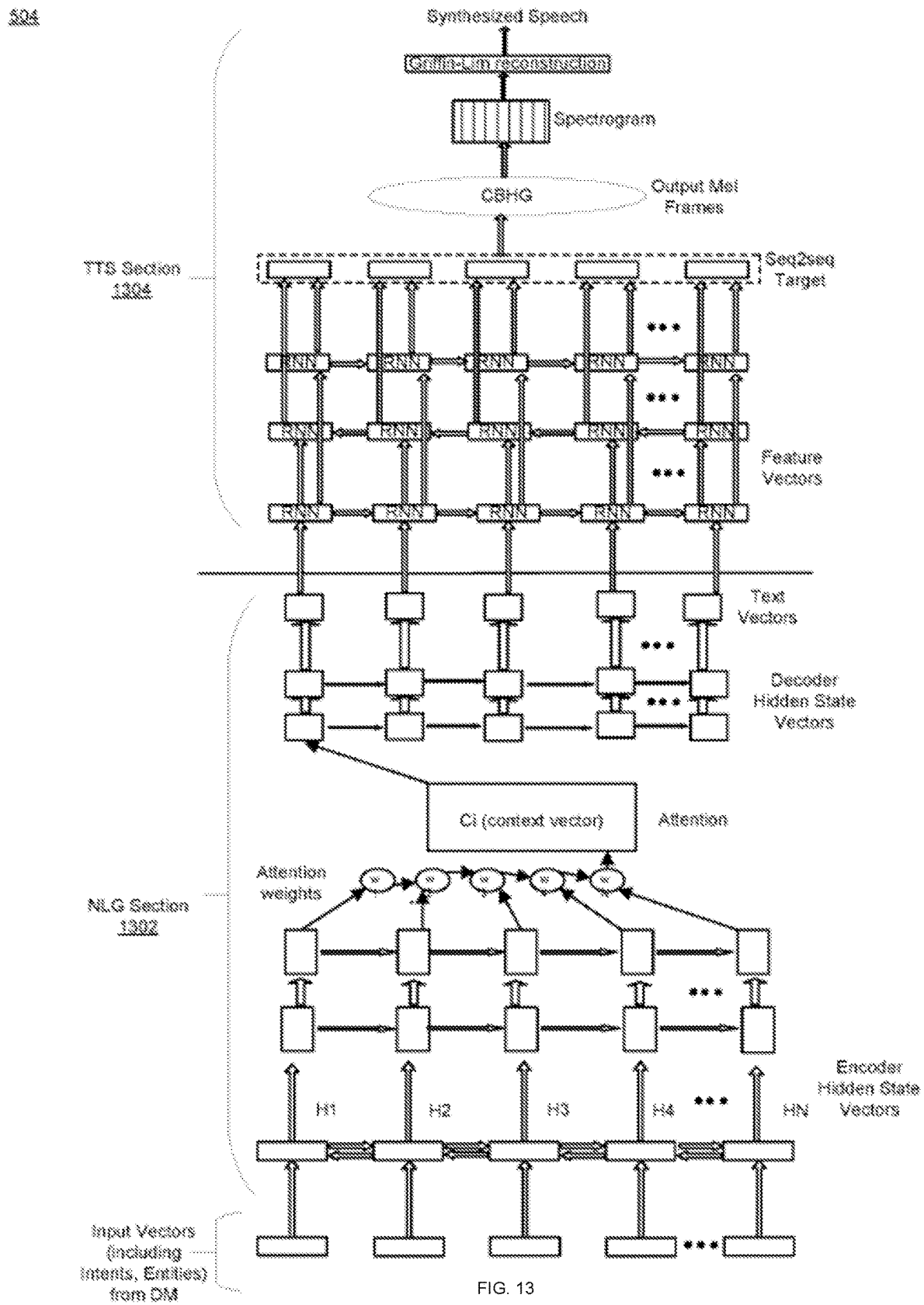
FIG. 13 is an example schematic of a second unified neural network in operation, according to one or more example implementations of the disclosure.
Figure 14:
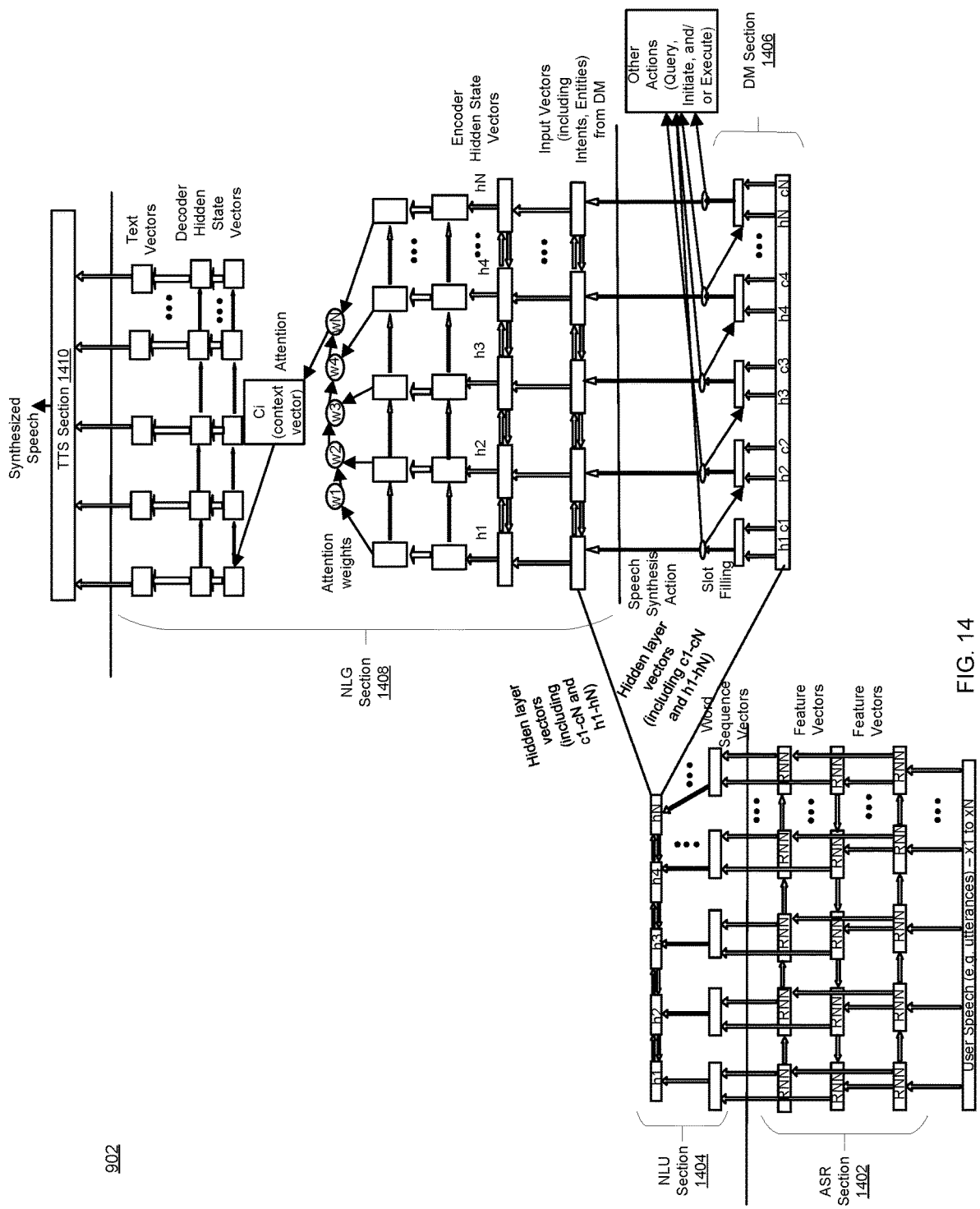
FIG. 14 is an example schematic of a single unified neural network of the speech processing system in operation, according to one or more example implementations of the disclosure.

Referring now at least to FIGS. 12-14, there is shown an example implementation of the unified neural networks, according to embodiments of the present disclosure. The unified neural networks, which may be employed by the speech processing systems of the present disclosure, may utilize recurrent neural networks (RNNs) or other neural network architecture for processing of the speech signal. It is to be understood that the recurrent neural network is one in which each layer represents another step-in time (or another step in some sequence), and that each time-step gets one input and predicts one output. However, the network may be constrained to use the same "transition function" for each time-step, thus learning to predict the output sequence from the input sequence for sequences of any length. Although standard RNNs are powerful in theory, they may be very difficult to train. In a standard RNN, the output at a given time t may depend exclusively on the inputs (via the hidden layer). However, while this makes sense in some contexts, many sequences have information relevant to output both before and after time-step t. For instance, in speech recognition, specifically, the sound before and after a given point may give information about the sound at a particular point in the sequence (e.g., phonemes corresponding with word or word itself at the particular point in sequence). In order to utilize this information, the disclosed unified neural networks may utilize RNNs with modified architecture, such as bi-directional Long Short Term Memory (LSTM) neural networks. Such bi-directional LSTM neural networks may include multiple hidden layers between the input and the output, and each hidden layer may receive input from the previous hidden layer as well as from the same hidden layer from the previous time-step. With each hidden layer having a direction associated with it, each hidden layer may receive input not just from its previous time-step but also from the previous hidden layers of both directions. Therefore, using the bi-directional LSTM neural networks may allow information to propagate for long distances both from the beginning and end of the sequence. Another example advantage of using bi-directional LSTM neural networks may allow information to pass in both directions between nodes. As appreciated by one of skill in the art, other types of neural networks such as a gated recurrent unit neural network, a convolutional neural network, a capsule neural network, etc. may be used. Other neural networks that provide similar functionality and advantages as described above may be used as appreciated by one of skill in the art.

FIG. 12 shows an example schematic of a first unified neural network, such as the first unified neural network 502 of FIGS. 5A-5B that may utilize an RNN (e.g., Long Short Term Memory (LSTM) type of RNN, such as a bi-directional LSTM neural network). As described above, other types of neural networks may be used to implement the first unified neural network 502 such that the implementation shown in FIG. 12 is for example purposes only and is not intended to be a limitation of this disclosure. In some implementations, the user speech (e.g. utterances) may be provided as an input. In one or more examples, the various "words" or "phonemes" in the user speech may be segmented and each segment may be filled in one of multiple slots x1 to xN of the LSTM neural network. In some examples, the slot identification may be achieved by the use of a dialogue manager, such as the dialogue manager 506. The ASR section (e.g., ASR section 1202) may include multiple levels or layers of the RNN (e.g., multiple levels or layers of the bi-directional LSTM neural network) to covert the speech segments into feature vectors. These feature vectors, collectively as a first network state, may represent intermediate text information. In some implementations, the feature vectors may be converted to word sequence vectors such that word sequence vectors may refer to first network state or feature vectors in combination with word sequence vectors may refer to first network state. These word sequence vectors may be fed to the NLU section (e.g., NLU section 1204) of the first unified neural network 502. Further, the word sequence vectors may be passed through hidden layers h1 to hN to generate hidden layer vectors, and the generated hidden layer vectors may be processed by a "Softmax" layer/function which may assign a probability to each element to extract the one or more of intents and entities therefrom.

FIG. 13 shows an example schematic of a second unified neural network in operation, such as the second unified neural network 504 of FIGS. 5A-5B and 8 that may utilize an RNN (e.g., Long Short Term Memory (LSTM) type of RNN, such as bi-directional LSTM neural network). As described above, other types of neural networks may be used to implement the second unified neural network 504 such that the implementation shown in FIG. 13 is for example purposes only and is not intended to be a limitation of this disclosure. In general terms, the second unified neural network 504 may be formed by inverting the functioning or operational direction of the first unified neural network 502 as described with reference to FIG. 12. In some implementations, input vectors may include one or more of intents and entities as derived from a dialogue manager, such as the dialogue manager 506. These inputs and entities may be in form of input vectors. In the NLG section (e.g., NLG section 1302) of the second unified neural network 504, the input vectors may be encoded into encoder hidden state vectors H1 to HN. In the NLG section 1302, each of the encoder hidden state vectors may be assigned an attention weight, such as attention weights w1 to wN, using an attention weight mechanism. Such vectors with attention weights when processed may generate a context vector or vectors, Ci which may also help with providing context (e.g., context of the original speech signal). These context vector(s) Ci may be fed to a decoder stage of the NLG section 1302, which may output decoder hidden state vectors. The decoder hidden state vectors may be converted to a second network state in the form of text vectors. The outputted second network state (e.g., in the form of text vectors) may represent a natural language generation text response. These text vectors may be fed to the TTS section (e.g., TTS section 1304) of the second unified neural network 504. In the TTS section 1304, the text vectors may be converted to feature vectors, which may be processed by multiple layers or levels of the RNN. These feature vectors may be then fed to a decoder, such as seq2seq target. The choice of seq2seq target for the decoder is generally for the efficacy of the proposed architecture, but other decoders (e.g., decoder targets) may be used. Further, to extract features from text, a gated recurrent unit (GRU), such as a convolutional bank highway network bidirectional GRU (CBHG) layer may be employed. The CBHG layer may output "Mel frames" which may be fed to a spectrogram to synthesize speech output. In one or more examples, the speech output may be synthesized using Griffin-Lim construction or MelGAN networks (also referred to as Mel Spectrogram generative adversarial networks).

FIG. 14 shows an example schematic of a single unified neural network in operation, such as the single unified neural network 902 of FIGS. 9A and 9B that may utilize an RNN (e.g., Long Short Term Memory (LSTM) type of RNN preferably bi-directional LSTM neural network). As described above, other types of neural networks may be used to implement the single unified neural network 902 such that the implementation shown in FIG. 14 is for example purposes only and is not intended to be a limitation of this disclosure. The single unified neural network 902 may include the ASR section (e.g., ASR section 1402) that may be configured to convert the speech signal into a first network state (e.g., user speech may be converted to feature vectors which may be converted to word sequence vectors). The single unified neural network 902 may include the NLU section (e.g., NLU section 1404) that may be configured to extract the one or more of intents and entities, as hidden layer vectors h1 to hN (as well as context vectors c1 to cN, in some examples), from the first network state (e.g., word sequence vectors). The ASR section 1402 and the NLU section 1404 may work in tandem with each other as described with reference to the ASR section 1202 and NLU section 1204 of the first unified neural network 502 of FIG. 12. The extracted intents and entities may be in vector form specifically part of hidden layer vectors h1 to hN (and may also include context vectors c1 to cN). The hidden layer vectors h1 to hN may be passed to both a dialogue manager section (such as, the dialogue manager (DM) section of the single neural network 902 of FIGS. 9A-9B and referred by the DM section 1406) as well as the NLG section (e.g., NLG section 1408). The dialogue manager section 1406 may perform the function of slot filling for the hidden layer vectors h1 to hN (as well as context vectors c1 to cN, in some examples) to provide context to the input which may aid in the speech synthesis by the NLG section 1408. Further, the dialogue manager section 1406 may perform actions such as query, initiate, and/or execute, in co-operation with external data source(s) (e.g., data source(s) 908) and external systems (e.g., external system 910) (as explained in above paragraphs and shown in FIG. 9B). When the single neural network 902 receives responses from the external data source(s) 908 and external system 910 (e.g., with respect to actions such as query, initiate, and/or execute) via input interface 904, the entire single neural network 902 may perform adjusted slot filling for hidden layer vectors h1 to hN, encoder hidden state vectors H1 to HN, context vectors c1 to cN, possibly other layers, etc. The dialogue manager section 1406 may perform adjusted slot filling when receiving events, return data, status, and/or user text (e.g., via input interface 904). Some layers may be fully activated, partially activated, or inactive based on these communications but may vary from neural network to neural network based on type of neural network and configuration of the neural network. These communications (e.g., text, events, return data, status) may be inputted to single neural network 902 at the beginning before ASR section 1402. The NLG section 1408 may work in cooperation with the TTS section (e.g., TTS section 1410), which may be implemented in a similar manner as the NLG section 1302 and the TTS section 1304 of FIG. 13, in order to synthesize speech output.

Figure 15:
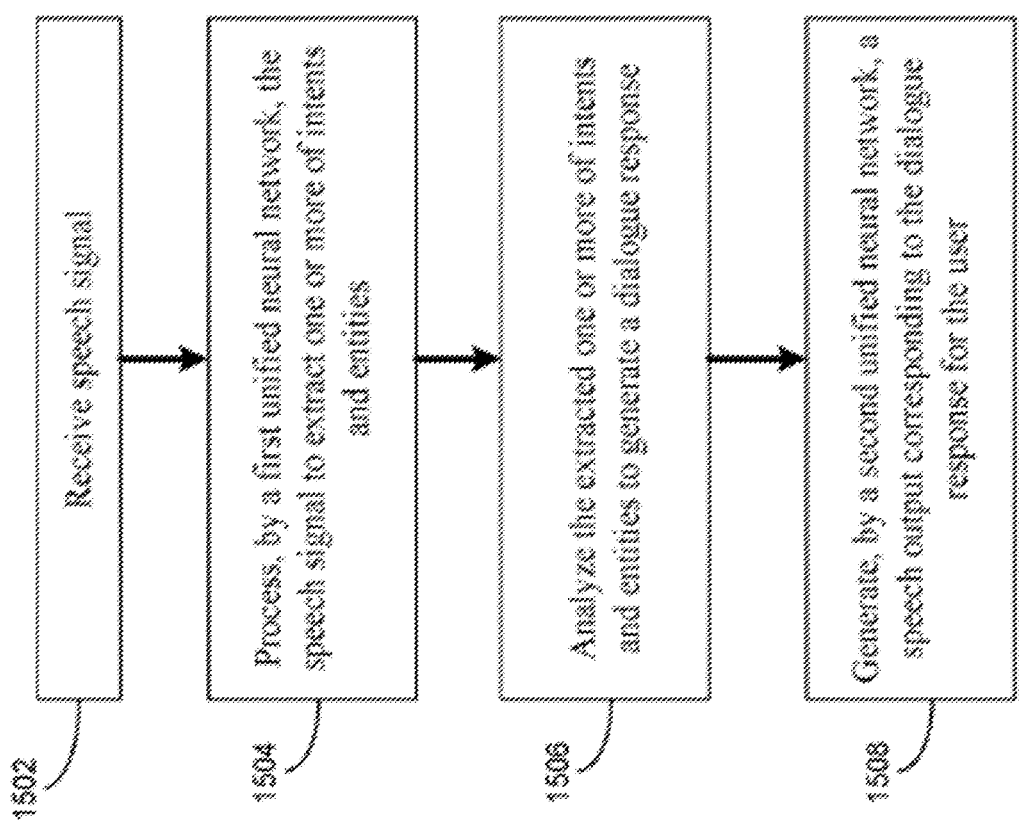
FIG. 15 is an example flowchart of a speech processing process, according to one or more example implementations of the disclosure.

As discussed above, and referring at least to the example implementation of FIG. 15, there is shown an example flowchart of a speech processing process 10, according to one or more example embodiments. In some implementations, speech processing process may receive 1502 a speech signal. The speech signal may be received by an input interface (such as, the input interface 508). In some implementations, speech processing process 10 may process 1504, by a first unified neural network (such as the first unified neural network 502), the received speech signal to extract one or more of intents and entities. In some implementations, speech processing process 10 may analyze 1506 the extracted intents and entities to generate an appropriate dialogue response. Such analysis may be performed by a dialogue manager (such as, the dialogue manager 506). In some implementations, speech processing process 10 may generate 1508, by a second unified neural network (such as, the second unified neural network 504), a speech output corresponding to the appropriate dialogue response for the user.

Figure 16:
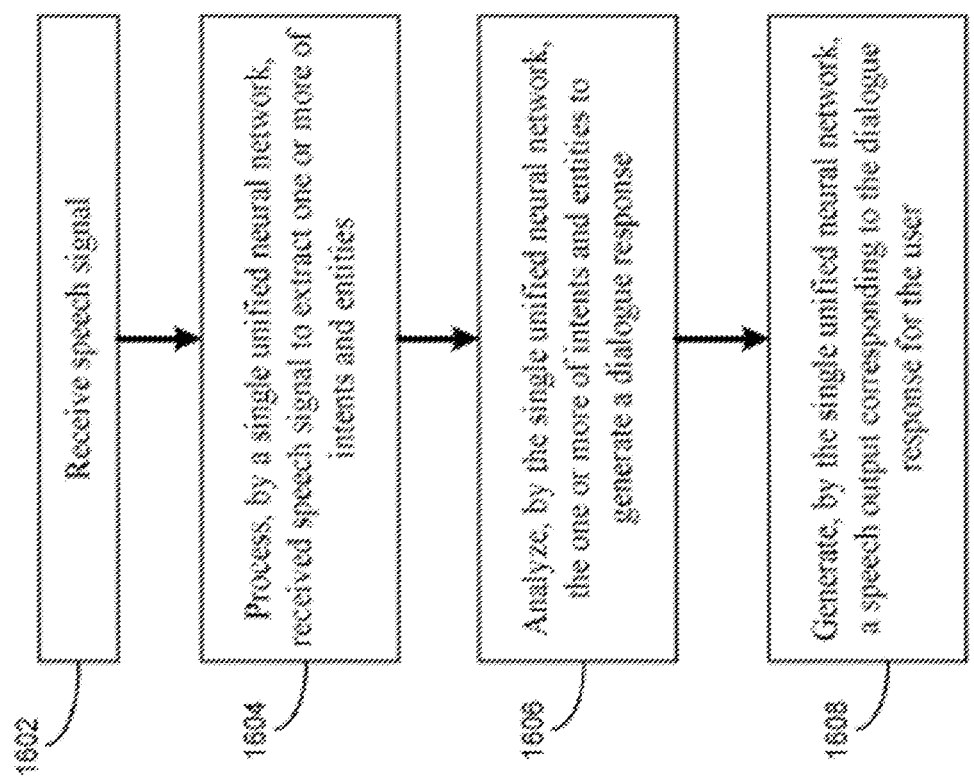
FIG. 16 is an example flowchart of a speech processing process, according to one or more example implementations of the disclosure.

As discussed above, and referring at least to the example implementation of FIG. 16, there is shown an example flowchart of a speech processing process 10, according to one or more example embodiments. In some implementations, speech processing process 10 may receive 1602 a speech signal. The speech signal may be received by an input interface (such as, the input interface 608). In some implementations, speech processing process 10 may process 1604, by a single unified neural network (such as, the single unified neural network 902), the received speech signal to extract one or more of intents and entities. In some implementations, speech processing process 10 may analyze 1606, by the single unified neural network 902, the extracted intents and entities to generate an appropriate dialogue response. Such analysis may be performed by a dialogue manager section (such as, the dialogue manager section 1406) of the single unified neural network 902. In some implementations, speech processing process 10 may generate 1608, by the single unified neural network 902, a speech output corresponding to the appropriate dialogue response for the user.

The different embodiments of the speech processing systems, as disclosed, with one or more unified neural networks, may provide efficient processing of speech signals by reducing complexity by use of fewer neural networks. The disclosed speech processing systems may use one or more unified neural networks to merge or unify a pipeline of multiple tasks in series (e.g., "unified neural network" may unify at least two tasks or functionalities, where each task is typically handled by separate neural networks such as a unified neural network that may unify ASR task with NLU task or a unified neural network that may unify NLG task and ASR task). This allows for two neural networks that each separately accomplish two different tasks, respectively, to be merged or combined to form one unified neural network that accomplishes both tasks. As the disclosed speech processing systems may merge or unify separate tasks together into one overall task within a unified neural network, it may be appreciated that latency for processing of speech signals may be improved, e.g., since there is no need to treat tasks as separate from one another. The disclosed speech processing systems may reduce complexity and thereby reduce produced errors by use of fewer neural networks which may improve speed and accuracy of processing (e.g., processing of the speech signal, processing of natural language generation, processing of dialogue manager response, etc.), which may be beneficial in certain applications, such as, e.g., virtual assistants and the like capable of communication with the user.

In some systems, there may be interface boundaries between components (related to multiple different tasks—e.g., boundary between ASR component and NLU component). Creating the unified neural network may eliminate interface boundaries that previously existed between components (e.g., softmax layer of the first unified neural network 502 may be eliminated in single unified neural network 902 when the first unified neural network 502 is unified with other neural networks such as the second neural network 504). For example, in the speech processing system shown in FIG. 1, ASR module output is text and the input to a NLU module is text. Text is an example boundary representation that may be needed so that the user may view outputs/inputs of these modules and some related ASR neural networks only function through output of text such that related NLU networks can then receive an input in the form of text. By unifying ASR with NLU, intermediate representations, such as text, are eliminated which may reduce the conversion steps and may boost accuracy. In general, a unified neural network may be formed by removing one or more interface boundaries allowing multiple (at least two or more) neural networks to be combined or merged together (e.g., sections of the neural networks may be connected to each other in order to form the unified neural networks described above).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A speech processing system for communicating with a user, comprising:
   an input interface configured to receive a speech signal, wherein the input interface is further configured to receive one or more events;
   a first unified neural network comprising an automatic speech recognition (ASR) section with ASR functionality and a natural language understanding (NLU) section with NLU functionality, the first unified neural network configured to process the speech signal to extract one or more of intents and entities, wherein a task processed by the ASR functionality of the ASR section and a task processed by the NLU functionality of the NLU section are both merged into a single task accomplished by the first unified neural network;
   a dialogue manager configured to analyze the one or more of intents and entities, wherein the dialogue manager is further configured to receive the one or more events from the input interface, wherein the dialogue manager is further configured to generate one or more control parameters for the first unified neural network based on the one or more events, wherein the first unified neural network is further configured to implement one or more models based on the one or more control parameters, and wherein the dialogue manager is further configured to instruct the first unified neural network to re-process the speech signal using the one or more models to generate a dialogue response; and
   a second unified neural network comprising a natural language generator (NLG) section with NLG functionality and a text-to-speech (TTS) section with TTS functionality, the second unified neural network configured to generate a speech output corresponding to the dialogue response for a user, wherein a task processed by the NLG functionality of the NLG section and a task processed by the TTS functionality of the TTS section are both merged into another single task accomplished by the second unified neural network, wherein the first unified neural network and the second unified neural network are bi-directional neural networks with a plurality of hidden layers, wherein the dialogue manager is further configured to analyze the one or more of intents and entities based upon, at least in part, the plurality of hidden layers, wherein at least a portion of the plurality of hidden layers receives information associated with the speech signal from previous hidden layers of both directions of the bi-directional neural network.

2. The speech processing system according to claim 1, wherein the ASR section of the first unified neural network is configured to convert the speech signal into a first network state and the NLU section of the first unified neural network is configured to extract the one or more of intents and entities from the first network state.

3. The speech processing system according to claim 2, wherein the NLG section of the second unified neural network is configured to generate a second network state corresponding to the dialogue response and the TTS section of the second unified neural network is configured to convert the second network state into the speech output.

4. The speech processing system according to claim 1, wherein the input interface is further configured to transmit the one or more events to the dialogue manager.

5. The speech processing system according to claim 1, wherein the dialogue manager is further configured to fetch data from an external database for analyzing the one or more of intents and entities to generate the dialogue response.

6. The speech processing system according to claim 1, wherein the first unified neural network and the second unified neural network are configured to implement at least one of one or more bi-directional Long Short Term Memory (LSTM) neural networks and one or more transformer neural networks.

7. The speech processing system according to claim 1, wherein the first unified neural network is further configured to extract a semantic relationship between the one or more of intents and entities; and the second unified neural network is further configured to analyze the semantic relationship between the one or more of intents and entities to generate the speech output corresponding to the dialogue response for the user.

8. The speech processing system according to claim 1, wherein the entities are composite entities.

9. A speech processing system for communicating with a user, comprising:
an input interface configured to receive a speech signal, wherein the input interface is further configured to receive one or more events; and
a single unified neural network, wherein the single unified neural network includes a plurality of sections each with a respective different functionality accomplished by the single unified neural network, the plurality of sections including an automatic speech recognition (ASR) section with ASR functionality configured to perform a first task to convert the speech signal into a first network state and a natural language understanding (NLU) section with NLU functionality configured to perform a second task to extract the one or more of intents and entities from the first network state, wherein the first task and the second task are merged into a single task, wherein the single unified neural network further includes a bi-directional neural network with a plurality of hidden layers, the single unified neural network configured to:
process the speech signal to extract one or more of intents and entities based upon, at least in part, the plurality of hidden layers, wherein at least a portion of the plurality of hidden layers receives information associated with the speech signal from previous hidden layers of both directions of the bi-directional neural network;
analyze the one or more of intents and entities;
generate one or more control parameters based on the one or more events;
implement one or more models based on the one or more control parameters;
instruct the single unified neural network to re-process the speech signal using the one or more models to generate a dialogue response; and
generate a speech output corresponding to the dialogue response for a user.

10. The speech processing system according to claim 9, wherein the single unified neural network further comprises:
a natural language generator (NLG) section of the plurality of sections configured to generate a second network state corresponding to the dialogue response; and
a text-to-speech (TTS) section of the plurality of sections configured to convert the second network state into the speech output.

11. The speech processing system according to claim 9, wherein the single unified neural network further comprises a dialogue manager section of the plurality of sections configured to fetch data from an external database for analyzing the one or more of intents and entities to generate the dialogue response.

12. The speech processing system according to claim 9, wherein the single neural network is further configured to process the speech signal to extract a semantic relationship between the one or more of intents and entities, wherein the single neural network is further configured to analyze the semantic relationship between the one or more of intents and entities to generate the dialogue response.

13. The speech processing system according to claim 9, wherein the entities are composite entities.

14. A computer implemented method for speech processing, comprising:
receiving a speech signal with one or more events;
processing, by a first unified neural network comprising an automatic speech recognition (ASR) section with ASR functionality and a natural language understanding (NLU) section with NLU functionality, the speech signal to extract one or more of intents and entities, wherein a task processed by the ASR functionality of the ASR section and a task processed by the NLU functionality of the NLU section are both merged into a single task accomplished by the first unified neural network;
analyzing the one or more of intents and entities, wherein the first unified neural network is a bi-directional neural network with a plurality of hidden layers, wherein the first unified neural network is configured to analyze the one or more of intents and entities based upon, at least in part, the plurality of hidden layers, wherein at least a portion of the plurality of hidden layers receives information associated with the speech signal from previous hidden layers of both directions of the bi-directional neural network;
generating one or more control parameters based on the one or more events,
implementing one or more models based on the one or more control parameters;
re-processing the speech signal using the one or more models to generate a dialogue response; and
generating, by a second unified neural network comprising a natural language generator (NLG) section with NLG functionality and a text-to-speech (TTS) section with TTS functionality, a speech output corresponding to the dialogue response for a user, wherein a task processed by the NLG functionality of the NLG section and a task processed by the TTS functionality of the TTS section are both merged into another single task accomplished by the second unified neural network.

15. The computer implemented method according to claim 14, further comprising converting, by the ASR section of the first unified neural network, the speech signal into a first network state and extracting, by the NLU section of the first unified neural network, the one or more of intents and entities from the first network state.

16. The computer implemented method according to claim 15, further comprising generating, by the NLG section of the second unified neural network, a second network state corresponding to the dialogue response and converting, by the TTS section of the second unified neural network, the second network state into the speech output.

17. The computer implemented method according to claim 14, wherein the entities are composite entities.

* * * * *